United States Patent
Tachi

(10) Patent No.: US 10,277,772 B2
(45) Date of Patent: Apr. 30, 2019

(54) FILE GENERATION APPARATUS, METHOD FOR CONTROLLING FILE GENERATION APPARATUS, AND STORAGE MEDIUM

(71) Applicant: CANON KABUSHIKI KAISHA, Tokyo (JP)

(72) Inventor: Daiki Tachi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/425,795

(22) Filed: Feb. 6, 2017

(65) Prior Publication Data
US 2017/0230529 A1    Aug. 10, 2017

(30) Foreign Application Priority Data
Feb. 8, 2016 (JP) ................. 2016-022057

(51) Int. Cl.
| | | |
|---|---|---|
| H04N 1/21 | (2006.01) | |
| H04N 1/00 | (2006.01) | |
| H04N 1/32 | (2006.01) | |
| G06F 17/30 | (2006.01) | |
| G06F 3/12 | (2006.01) | |
| G06K 15/02 | (2006.01) | |

(52) U.S. Cl.
CPC ......... *H04N 1/2166* (2013.01); *G06F 3/1204* (2013.01); *G06F 3/1273* (2013.01); *G06F 3/1285* (2013.01); *G06F 17/3012* (2013.01); *H04N 1/00* (2013.01); *H04N 1/00204* (2013.01); *H04N 1/00344* (2013.01); *H04N 1/00832* (2013.01); *H04N 1/32101* (2013.01); *H04N 2201/0094* (2013.01); *H04N 2201/3202* (2013.01)

(58) Field of Classification Search
None
See application file for complete search history.

(56) References Cited

U.S. PATENT DOCUMENTS

| | | | | |
|---|---|---|---|---|
| 5,935,262 | A * | 8/1999 | Barrett | H04L 43/00 714/46 |
| 7,274,476 | B2 * | 9/2007 | Eguchi | H04N 1/00212 358/1.15 |
| 2002/0120638 | A1 * | 8/2002 | Boehmke | H04M 3/2218 |
| 2002/0138762 | A1 | 9/2002 | Horne | |
| 2003/0103242 | A1 * | 6/2003 | Tanimoto | H04N 1/2166 358/402 |
| 2003/0117665 | A1 * | 6/2003 | Eguchi | H04N 1/00212 358/402 |
| 2004/0119761 | A1 * | 6/2004 | Grossman | G06Q 10/10 715/854 |

(Continued)

FOREIGN PATENT DOCUMENTS

| | | |
|---|---|---|
| CA | 2327211 A1 | 6/2002 |
| CN | 103297640 A | 9/2013 |

(Continued)

*Primary Examiner* — Beniyam Menberu
(74) *Attorney, Agent, or Firm* — Canon U.S.A., Inc. IP Division

(57) ABSTRACT

A mechanism for enabling identification of an execution history of what type of job a generated file is from a filename of the file. The mechanism includes generating the file based on the execution history of the job, and generating the filename of the file based on the type of the job.

11 Claims, 16 Drawing Sheets

(56) References Cited

U.S. PATENT DOCUMENTS

| | | | |
|---|---|---|---|
| 2004/0190073 A1* | 9/2004 | Kato | H04N 1/00204 358/400 |
| 2006/0028691 A1* | 2/2006 | Shinomiya | H04N 1/00209 358/402 |
| 2007/0111704 A1* | 5/2007 | Linkert | H04M 1/72519 455/405 |
| 2007/0180236 A1* | 8/2007 | Kuroyanagi | H04L 63/0428 713/162 |
| 2007/0250541 A1* | 10/2007 | Takeda | G06F 17/3012 |
| 2007/0258106 A1* | 11/2007 | Ishiyama | H04N 1/32112 358/1.15 |
| 2008/0016515 A1* | 1/2008 | Naim | H04L 63/0227 719/313 |
| 2008/0112009 A1* | 5/2008 | Tojo | G06F 11/3476 358/1.15 |
| 2008/0151330 A1* | 6/2008 | Takahata | H04N 1/00352 358/497 |
| 2008/0218810 A1* | 9/2008 | Itoh | G06F 21/6227 358/440 |
| 2008/0228937 A1* | 9/2008 | Araumi | H04N 1/00344 709/232 |
| 2009/0187665 A1* | 7/2009 | Ozawa | G06F 17/30 709/228 |
| 2011/0154479 A1* | 6/2011 | Terabe | H04N 1/4413 726/16 |
| 2013/0227358 A1* | 8/2013 | Yokokura | G06F 11/0733 714/57 |
| 2014/0147156 A1* | 5/2014 | Matsushita | G03G 15/5066 399/83 |
| 2015/0370519 A1 | 12/2015 | Tachi | |

FOREIGN PATENT DOCUMENTS

| | | | | |
|---|---|---|---|---|
| CN | 103645866 A | | 3/2014 | |
| JP | 2003-296163 | * | 10/2003 | G06F 12/00 |
| JP | 2005-078160 A | | 3/2005 | |

\* cited by examiner

FIG. 10

| START TIME | DESTINATION ADDRESS | PROTOCOL | SERIAL NUMBER | COMMUNICATION RESULT | FILE FORMAT | USERNAME | OUTPUT FLAG |
|---|---|---|---|---|---|---|---|
| 20150311 0900 | 00-1111-2222 | FAX | 0001 | OK |  | aaa | OUTPUT |
| 20150316 0915 | server.xyz.co.jp | SMB | 0002 | NG | PDF | aaa | OUTPUT |
| 20150316 0925 | server.xyz.co.jp | SMB | 0003 | OK | PDF | aaa | OUTPUT |
| 20150316 0948 | server.abc.co.jp | SMB | 0004 | OK | PDF | bbb | NOT OUTPUT |
| 20150316 1015 | 00-1122-6688 | FTP | 0005 | OK |  | ccc | NOT OUTPUT |
| 20150316 1029 | server.lmn.co.jp | FAX | 0006 | OK | JPEG | ccc | NOT OUTPUT |
| 20150316 1112 | abcd@efg.co.jp | Email | 0007 | OK | PDF | ddd | NOT OUTPUT |
| 20150316 1122 | 00-1111-2222 | FAX | 0008 | OK |  | aaa | NOT OUTPUT |
| 20150316 1130 | xyz@efg.co.jp | Email | 0009 | OK | PDF | ddd | NOT OUTPUT |
| 20150316 1305 | 00-1111-2222 | FAX | 0010 | OK |  | aaa | NOT OUTPUT |
| 20150316 1353 | server.abc.co.jp | SMB | 0011 | NG | PDF | aaa | NOT OUTPUT |
| 20150316 1405 | server2.abc.co.jp | SMB | 0012 | OK | PDF | eee | NOT OUTPUT |

FIG. 12A

COMMUNICATION MANAGEMENT REPORT

■ SPECIFIED NUMBER OF COMMUNICATIONS
1301　1302　1303
[PRINT] [TRANSMISSION] [OFF]

■ NUMBER OF COMMUNICATIONS
1307　1308
[ ] [100] (100〜1000)

■ SPECIFIED TIME
1304　1305　1306
[PRINT] [TRANSMISSION] [OFF]

1309　1310
[ ] [12:34] (00:00〜23:54)

1312
[TRANSMISSION DESTINATION]

1313
[server.abc.co.jp]

1314 [CANCEL]　　[OK] 1315

FIG. 12B

FAX MANAGEMENT REPORT

■ SPECIFIED NUMBER OF COMMUNICATIONS
1401　1402　1403
[PRINT] [TRANSMISSION] [OFF]

■ NUMBER OF COMMUNICATIONS
1407　1408
[ ] [40] (40〜1000)

■ SPECIFIED TIME
1404　1405　1406
[PRINT] [TRANSMISSION] [OFF]

1409　1410
[ ] [01:23] (00:00〜23:54)

1412
[TRANSMISSION DESTINATION]

1413
[server.abc.co.jp]

1414 [CANCEL]　　[OK] 1415

FILE GENERATION APPARATUS, METHOD FOR CONTROLLING FILE GENERATION APPARATUS, AND STORAGE MEDIUM

BACKGROUND OF THE INVENTION

Field of the Invention

The present invention relates to a file generation apparatus that can generate a file of an execution history of jobs, a method for controlling the file generation apparatus, and a storage medium.

Description of the Related Art

There has been an apparatus that can store an execution history of executed jobs.

Japanese Patent Application Laid-Open No. 2005-78160 discusses a print job management apparatus that collects an execution history of print jobs from multifunction peripherals (MFPs), stores a plurality of execution histories of print jobs, and transmits the stored plurality of execution histories to user computers by email.

Conventionally, a user has opened a stored file to browse the contents and check a type of the job execution history included in the file.

However, the user has not been able to identify the type of the job execution history included in the file from a filename of the file.

For example, suppose that there is generated a plurality of files including execution histories. Even if a list of the plurality of files is displayed, which file includes what type of execution history is not identifiable from the filenames.

According to the technique discussed in Japanese Patent Application Laid-Open No. 2005-78160, the execution history is of print jobs in the email body. The execution history is not transmitted in the form of a file.

SUMMARY OF THE INVENTION

According to an aspect of the present invention, a file generation apparatus includes a file generation unit configured to generate a file based on an execution history of a job, and a filename generation unit configured to generate a filename of the file based on a type of the job.

Further features of the present invention will become apparent from the following description of exemplary embodiments with reference to the attached drawings.

BRIEF DESCRIPTION OF THE DRAWINGS

FIG. 10 is a table illustrating a transmission history database according to the exemplary embodiment of the present invention.

FIGS. 12A and 12B are diagrams illustrating operation screens of the MFP according to the exemplary embodiment of the present invention.

DESCRIPTION OF THE EMBODIMENTS

Exemplary embodiments for realizing the present invention will be described below with reference to the drawings. The exemplary embodiments described below are not intended to limit the invention set forth in the claims, and not all combinations of features described in the exemplary embodiments are necessarily indispensable to the solving means of the invention.

A first exemplary embodiment of the present invention will be described below with reference to the drawings.

Figure 1:
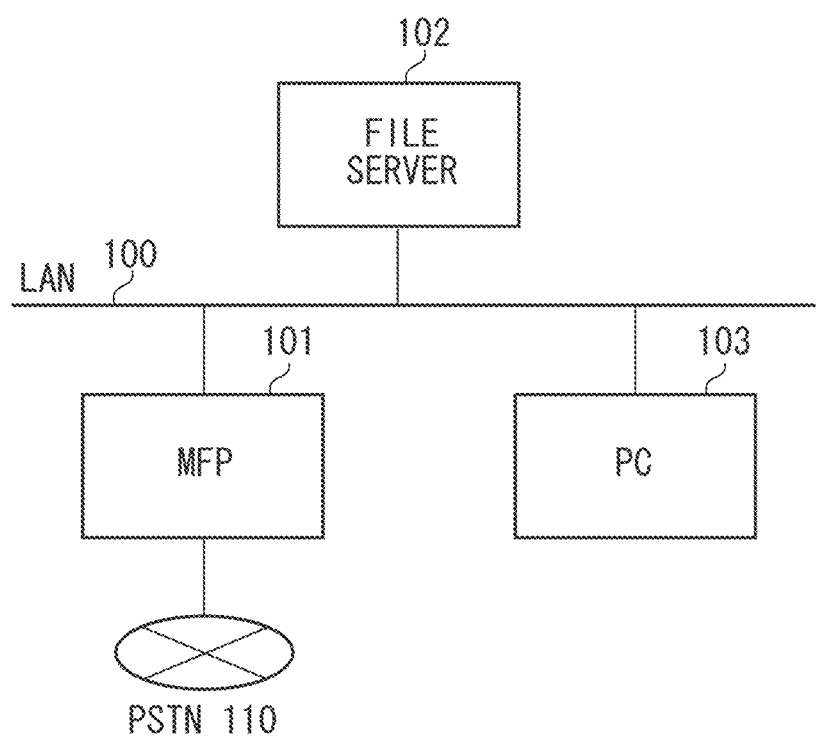
FIG. 1 is a block diagram illustrating an entire data processing system according to an exemplary embodiment of the present invention.

FIG. 1 is a block diagram illustrating a configuration of a data processing system according to the present exemplary embodiment of the present invention.

The data processing system according to the present exemplary embodiment includes an MFP 101 as an example of the file generation apparatus, a file server 102, and a personal computer (PC) 103. Other than such apparatuses, a plurality of personal computers (PCs) and/or a plurality of servers may be connected to a local area network (LAN) 100. The MFP 101 is not limited to the MFP that communicates with the file server 102 and the PC 103 by wired communications such as the LAN 100. The MFP 101 may communicate with the file server 102 and the PC 103 by wireless communications such as Wireless Fidelity (WiFi). The MFP 101 is connected to the public switched telephone network (PSTN) 110 and can perform facsimile transmission and reception with other facsimile apparatuses connected to the PSTN 110.

Figure 2:
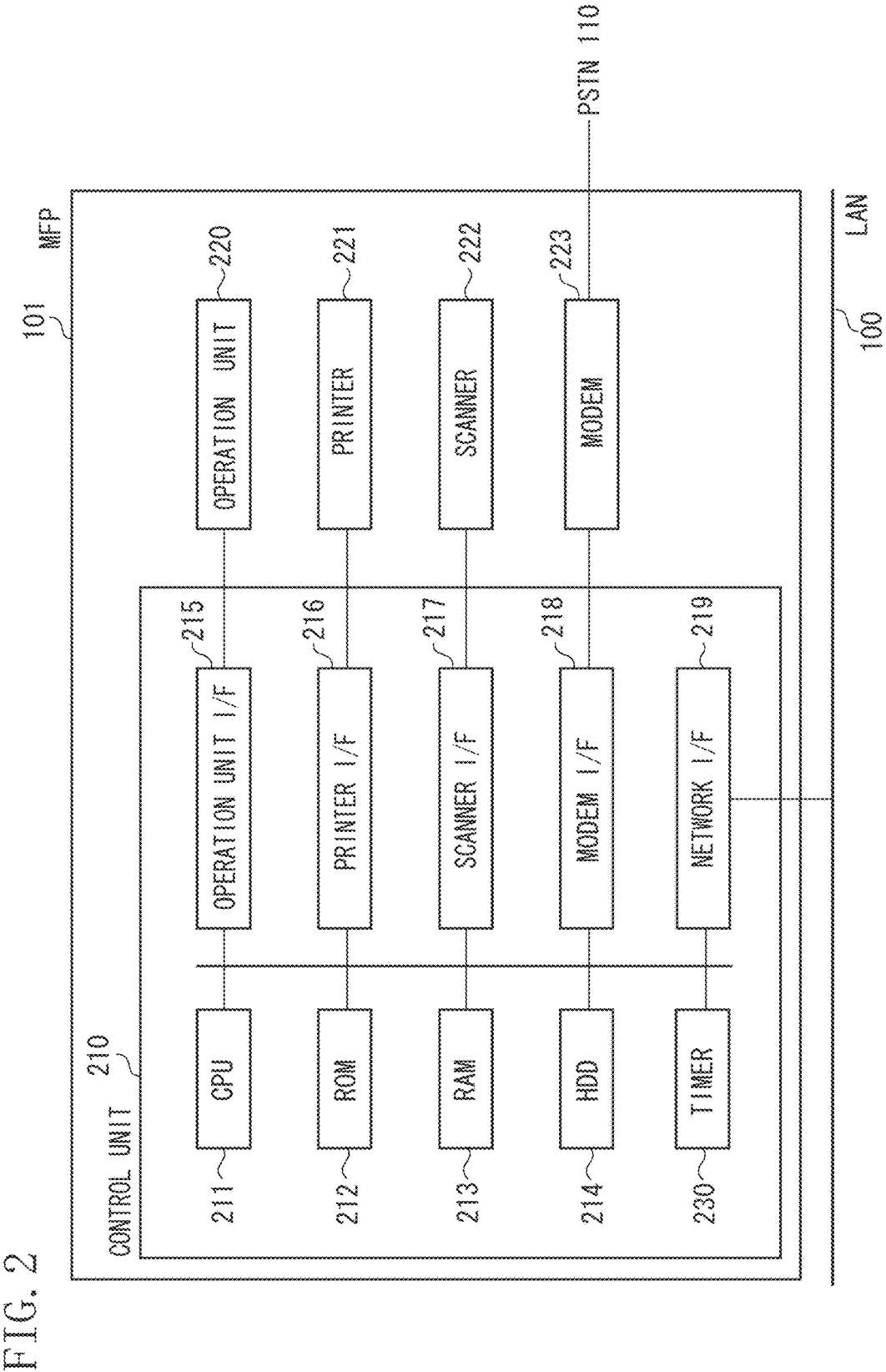
FIG. 2 is a block diagram illustrating a configuration of a multifunction peripheral (MFP) according to the exemplary embodiment of the present invention.

FIG. 2 is a block diagram illustrating a configuration of the MFP 101.

The MFP 101 includes a control unit 210, an operation unit 220, a printer 221, a scanner 222, and a modem 223. The operation unit 220 includes a display unit and hardware keys. The display unit includes a liquid crystal display unit to which a touch panel sheet is attached. The operation unit 220 displays an operation screen and a notification screen on the liquid crystal display unit. The operation unit 220 accepts operations from a user via the touch panel sheet and/or the hardware keys.

The printer 221 prints an image on a sheet based on image data transmitted from the control unit 210. The scanner 222 reads an image of a document to generate image data expressing the read image of the document, and transmits the generated image data to the control unit 210.

The control unit 210 includes a central processing unit (CPU) 211, a read-only memory (ROM) 212, a random access memory (RAM) 213, a hard disk drive (HDD) 214, a timer 230, an operation unit interface (I/F) 215, a printer I/F 216, a scanner I/F 217, a modem I/F 218, and a network I/F 219. Such units are connected via a bus.

The CPU 211 controls the MFP 101 in a comprehensive manner by executing programs stored in the ROM 212. The ROM 212 stores various programs to be read by the CPU 211. The RAM 213 functions as a work area of the CPU 211. The HDD 214 is a large-capacity storage medium storing image data and application programs. The timer 230 manages time.

The operation unit I/F 215 controls input and output of data between the control unit 210 and the operation unit 220. The printer I/F 216 performs control for transmitting and receiving commands for the control unit 210 to control the printer 221 to/from the printer 221. The printer I/F 216 also performs control for transmitting image data transmitted from the control unit 210 to the printer 221. The scanner I/F 217 performs control for transmitting and receiving commands for the control unit 210 to control the scanner 222 to/from the scanner 222. The scanner I/F 217 also performs control for receiving image data from the scanner 222.

The modem I/F 218 performs control for transmitting and receiving commands for the control unit 210 to control the modem 223, to/from the modem 223. The modem I/F 218 also performs control for transmitting image data transmitted from the control unit 210 to the modem 223. The modem I/F 218 further performs control for receiving image data from the modem 223. The modem 223 is connected to the PSTN 110 and performs facsimile transmission and reception. The modem 223 modulates a facsimile digital signal received from the control unit 210 into an analog signal and transmits the analog signal to the PSTN 110. The modem 223 demodulates a facsimile analog signal received from the PSTN 110 into a digital signal and transmits the digital signal to the control unit 210. The network I/F 219 is connected to the LAN 100. The network I/F 219 performs control so that the MFP 101 communicates with external apparatuses, such as the file server 102 and the PC 103, via the LAN 100.

Figure 3:
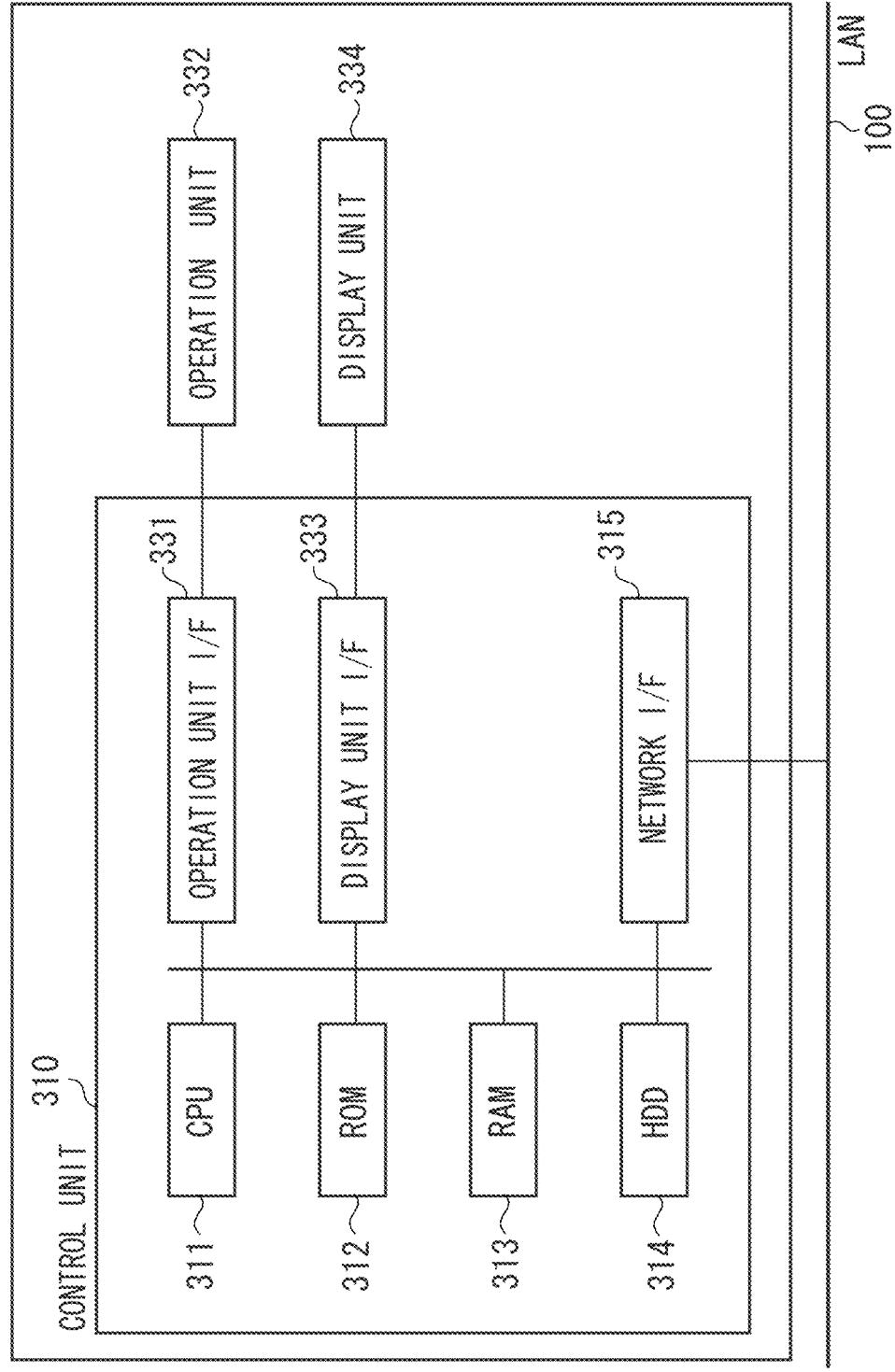
FIG. 3 is a block diagram illustrating a configuration of a file server according to the exemplary embodiment of the present invention.

FIG. 3 is a block diagram illustrating a configuration of the file server 102. The PC 103 has a configuration similar to that of the file server 102.

The file server 102 includes a control unit 310, an operation unit 332, and a display unit 334.

The control unit 310 includes a CPU 311, a ROM 312, a RAM 313, an HDD 314, an operation unit I/F 331, a display unit I/F 333, and a network I/F 315.

The CPU 311 controls the file server 102 in a comprehensive manner by executing programs stored in the ROM 312. The ROM 312 stores various programs to be read by the CPU 311. The RAM 313 functions as a work area of the CPU 311. The HDD 314 is a large-capacity storage medium storing image data and application programs.

The operation unit I/F 331 controls input and output of data between the control unit 310 and the operation unit 332. The operation unit 332 includes a keyboard and a mouse, and accepts operations from the user. The display unit I/F 333 controls input and output of data between the control unit 310 and the display unit 334. The display unit 334 includes a liquid crystal display or a plasma display, and displays a screen. The network I/F 315 is connected to the LAN 100. The network I/F 315 performs control so that the file server 102 communicates with the MFP 101 and the PC 103 via the LAN 100.

The above is the description of the configuration of the data processing system according to the present exemplary embodiment.

The MFP 101 described above authenticates the user who uses the MFP 101. The MFP 101 permits the user to use the MFP 101 if the user is successfully authenticated.

Figure 4:
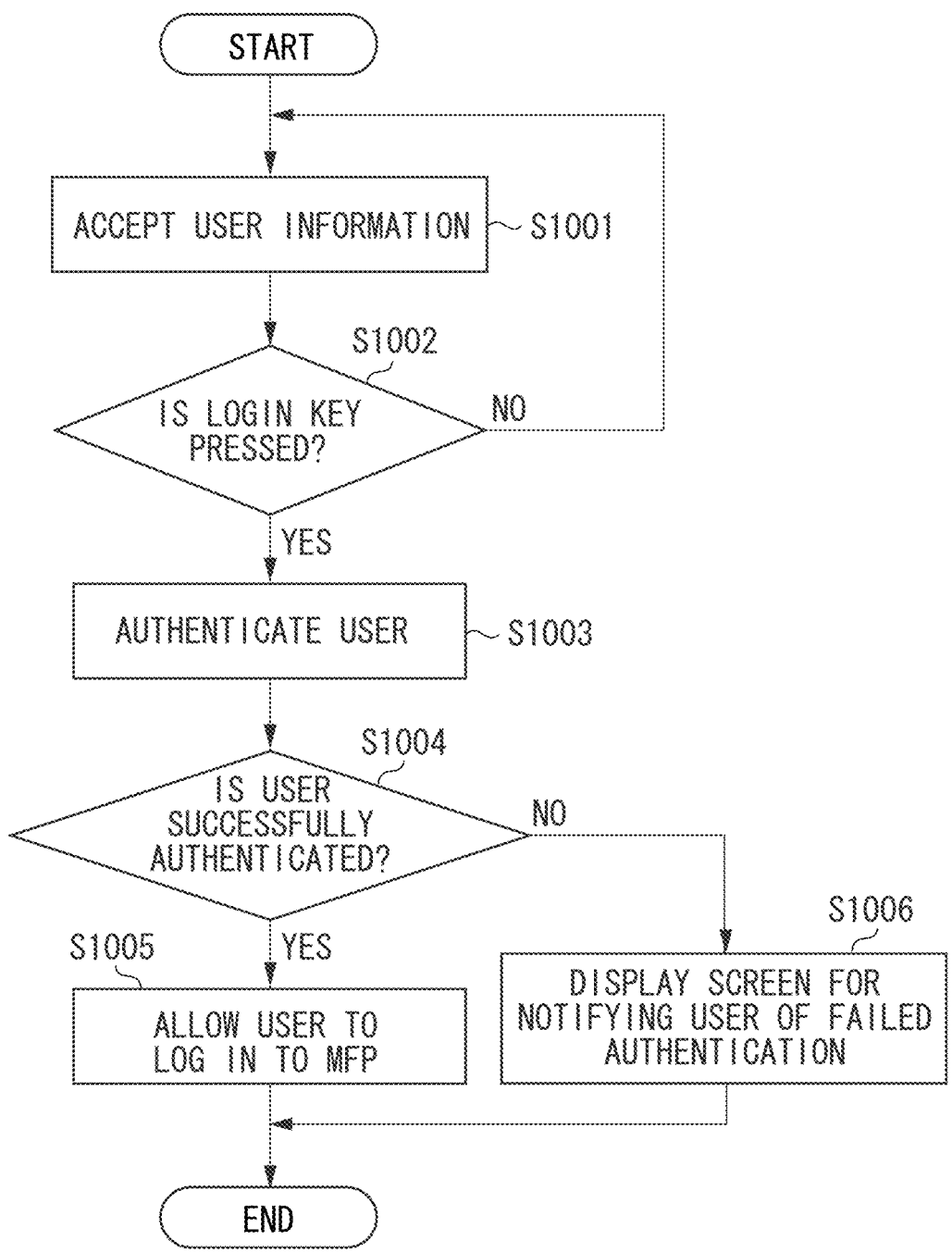
FIG. 4 is a flowchart illustrating an operation of the MFP according to the exemplary embodiment of the present invention.

FIG. 4 is a flowchart illustrating processing by which the MFP 101 authenticates the user. The processing illustrated in the flowchart of FIG. 4 is implemented by the CPU 211 reading a program stored in the ROM 212 into the RAM 213 and executing the program.

Figure 5:
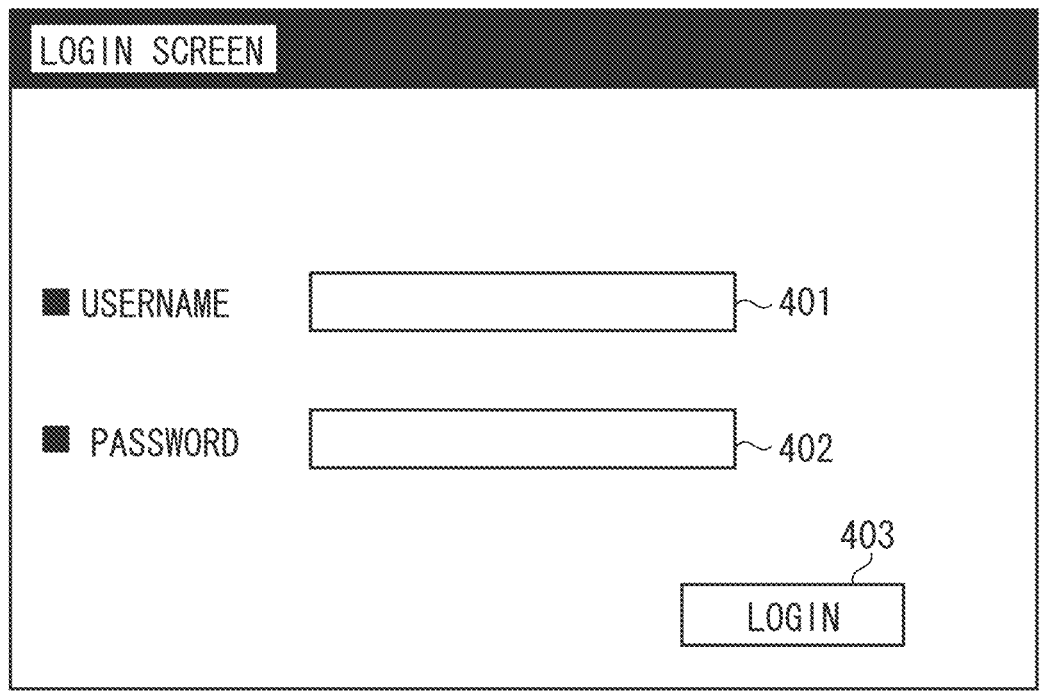
FIG. 5 is a diagram illustrating an operation screen of the MFP according to the exemplary embodiment of the present invention.

In step S1001, the CPU 211 accepts user information from the user. More specifically, the CPU 211 initially displays a login screen illustrated in FIG. 5 on the operation unit 220. The user operates the operation unit 220 to input a username and a password. More specifically, the user touches an area 401 and inputs the username via a displayed keyboard. The user then touches an area 402 and inputs the password via a displayed keyboard. The CPU 211 stores the accepted username and password into the RAM 213. In this example, the user inputs the username and password via the displayed keyboards. However, the present invention is not limited thereto. For example, the user may carry an integrated circuit (IC) card and bring the IC card close to a card reading unit (not illustrated) of the MFP 101. The MFP 101 can obtain the username and password from the IC card by wireless communication.

In step S1002, the CPU 211 determines whether a login key 403 is pressed. If the CPU 211 determines that the login key 403 is not pressed (NO in step S1002), the processing returns to step S1001. On the other hand, if the CPU 211 determines that the login key 403 is pressed (YES in step S1002), the processing proceeds to step S1003.

In step S1003, the CPU 211 compares the accepted username and password with usernames and passwords previously stored in the HDD 214 to authenticate the user.

In step S1004, the CPU 211 determines whether the user is successfully authenticated. If the CPU 211 determines that the user authentication is failed (NO in step S1004), the processing proceeds to step S1006. In step S1006, the CPU 211 displays a screen for notifying the user of the failed authentication on the operation unit 220.

On the other hand, if the CPU 211 determines that the user authentication is successfully authenticated (YES in step S1004), the processing proceeds to step S1005. In step S1005, the CPU 211 allows the user to log in to the MFP 101. Then, the processing ends. To manage the user logged in to the MFP 101, the CPU 211 stores the username of the user logged in to the MFP 101 into the RAM 213. The user logged in to the MFP 101 is permitted to use the MFP 101. If the use of the MFP 101 is permitted, an operation screen for using the MFP 101 is displayed on the operation unit 220.

Figure 6:
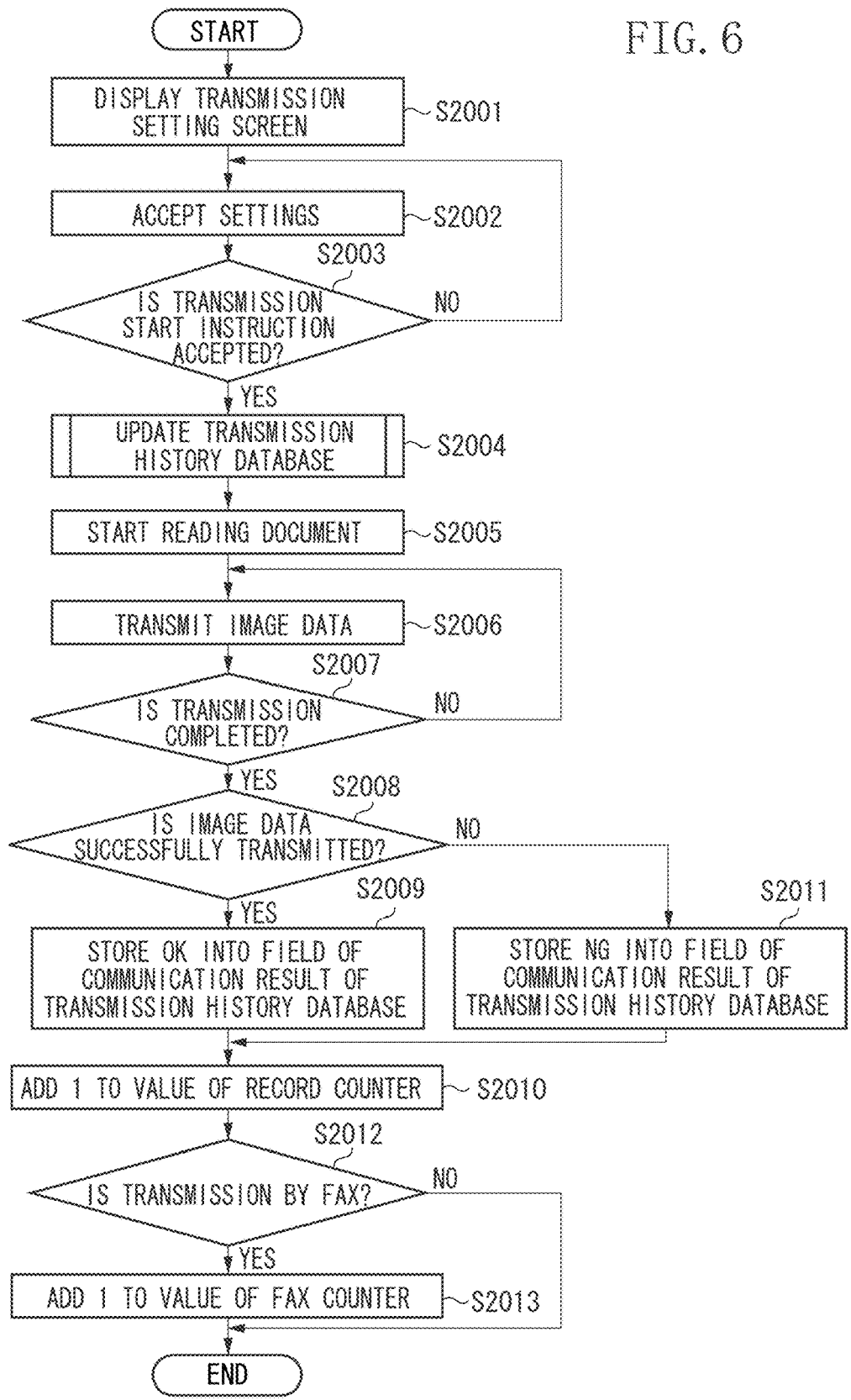
FIG. 6 is a flowchart illustrating an operation of the MFP according to the exemplary embodiment of the present invention.

FIG. 6 is a flowchart illustrating processing by which the MFP 101 performs a transmission job for reading a document and transmitting image data expressing the read image of the document to a specified destination. The processing illustrated in the flowchart of FIG. 6 is implemented by the CPU 211 reading a program stored in the ROM 212 into the RAM 213 and executing the program.

In step S2001, the CPU 211 displays a transmission setting screen on the operation unit 220. The transmission setting screen and other operation screens displayed on the operation unit 220 will be described here with reference to FIGS. 7 to 9B.

Figure 7:
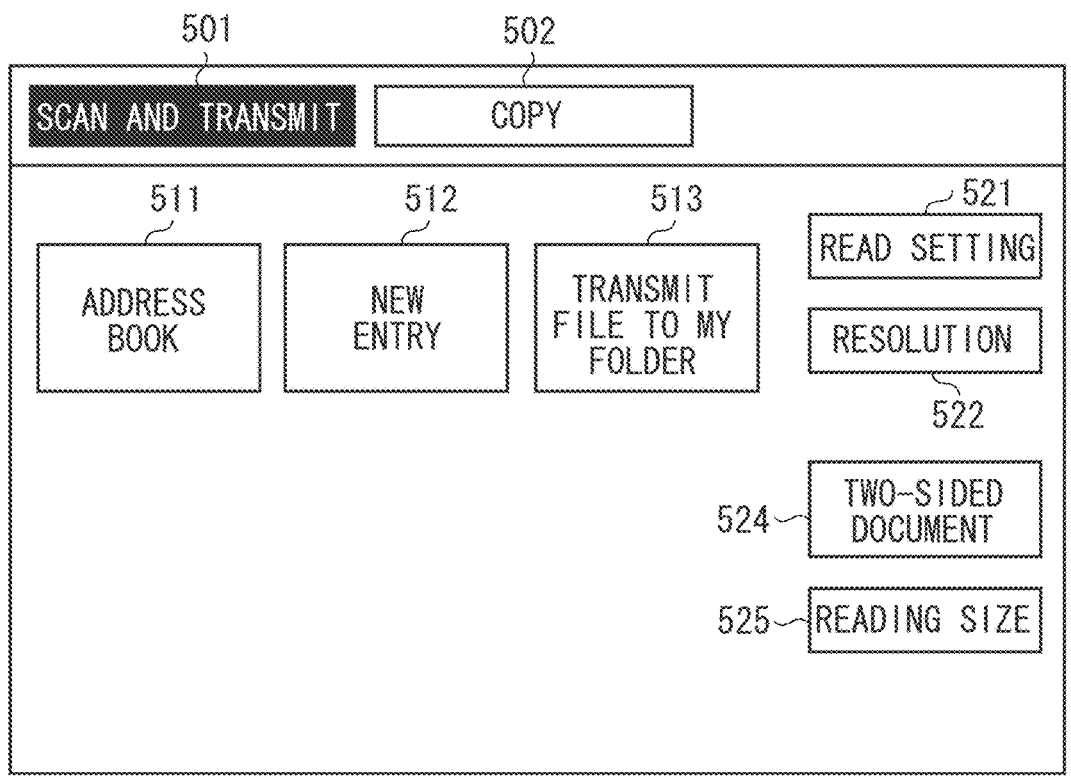
FIG. 7 is a diagram illustrating an operation screen of the MFP according to the exemplary embodiment of the present invention.

FIG. 7 illustrates an example of the transmission setting screen. The user can operate any one of operation keys 501 and 502 on the transmission setting screen of FIG. 7 to select a function. FIG. 7 illustrates a state in which the operation key 501 is selected. While FIG. 7 illustrates "scan and transmit" and "copy" as examples of the functions, the MFP 101 may include other functions.

Selecting the operation key 501, the user can operate any one of operation keys 511 to 513 to set the destination of image data to be transmitted.

The operation key 511 is an address book key. If the operation key 511 is operated, the contents of an address book stored in the HDD 214 are displayed. The user can refer to a list of destinations registered in the address book and select a desired destination to set the destination of the image data. The operation key 512 is a new entry key. If the operation key 512 is operated, a screen for accepting input of a new destination from the user is displayed. The user can input a new destination via the displayed screen and set the new destination as the destination of the image data. The screen displayed in this case will be described below with reference to FIG. 8A. The operation key 513 is a "transmit file to my folder" key. The operation key 513 is operated if the user wants to set the user's own folder as the destination of the image data (if the user wants to transmit a file of the image data with the user's own folder as the destination). If the user operates the operation key 513, path information about the user's own folder is automatically set as the destination of the image data. The path information about the user's own folder is managed in the HDD 214 in advance in association with the user.

An operation key 521 is an operation key used to make a setting about whether to read a document in color or in monochrome. An operation key 522 is an operation key used to set reading resolution. An operation key 524 is an operation key used to make a setting about one-sided/two-sided reading. An operation key 525 is an operation key used to set a reading size.

After such a screen is displayed, the processing proceeds to step S2002. In step S2002, the CPU 211 accepts settings via the displayed screen. For example, the CPU 211 accepts read settings including the setting about whether to read a document in color or in monochrome and the reading resolution. The CPU 211 stores the accepted read settings into the HDD 214. In step S2002, the CPU 211 also accepts transmission settings about the destination and a file format of the image data via the screens illustrated in FIGS. 8A to 9B.

Figure 8A:
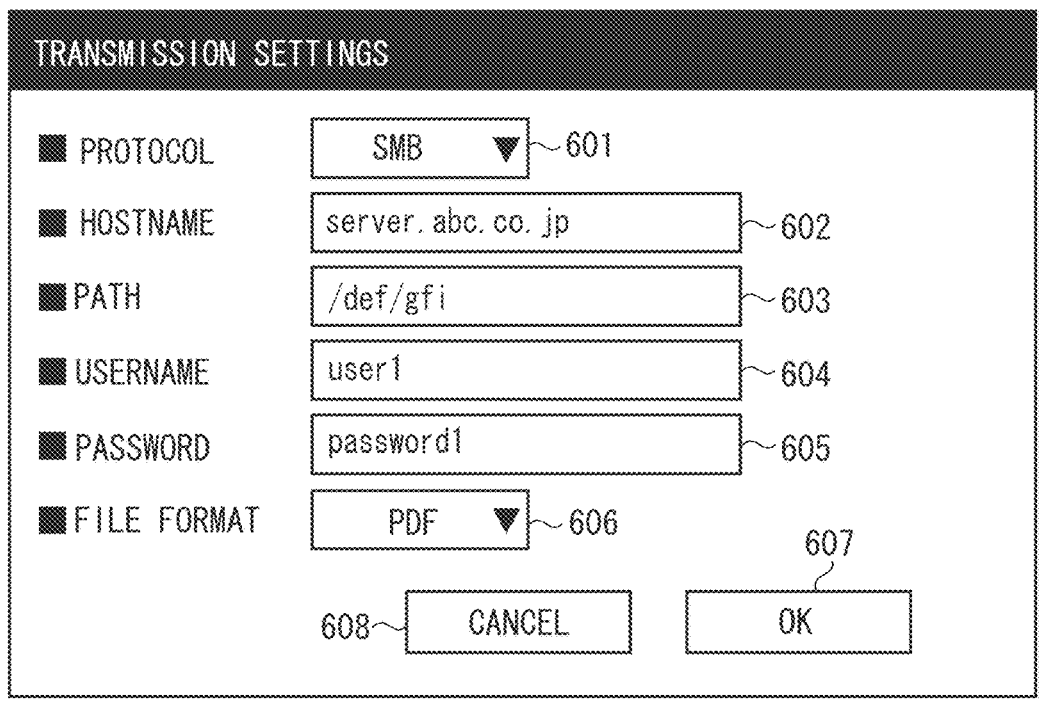
FIGS. 8A and 8B are diagrams illustrating operation screens of the MFP according to the exemplary embodiment of the present invention.

FIG. 8A is a diagram illustrating an example of an operation screen displayed on the operation unit 220. The operation screen illustrated in FIG. 8A is displayed if the operation key 512 of FIG. 7 is pressed.

An area 601 is an area for accepting selection of a transmission protocol. The area 601 displays a drop-down list of options including Server Message Block (SMB), the File Transfer Protocol (FTP), email (electronic mail), and facsimile (FAX). However, the options may include other transmission protocols.

In the screen illustrated in FIG. 8A, SMB is selected as the transmission protocol.

An area 602 is an area for accepting a hostname of a server that manages a folder serving as the destination of the image data. For example, the hostname of the file server 102 is input to the area 602. An area 603 is an area for accepting a path of the folder serving as the destination of the image data. An area 604 is an area for accepting a username needed to log in to the folder serving as the destination of the image data. An area 605 is an area for accepting a password needed to log in to the folder serving as the destination of the image data. The username and the password will be collectively referred to as authentication information. An area 606 is an area for accepting selection of the file format. The area 606 displays a drop-down list of options including the Portable Document Format (PDF) and Tagged Image File Format (TIFF). However, the options may include other file formats.

If an OK key 607 is pressed, the CPU 211 stores the transmission settings accepted via the screen into the HDD 214. The screen illustrated in FIG. 8A is then closed, and the screen illustrated in FIG. 7 is displayed on the operation unit 220. In this case, the screen illustrated in FIG. 7 may display the contents of the transmission settings made from the screen illustrated in FIG. 8A. If a cancel key 608 is pressed, the CPU 211 discards the transmission settings accepted via the screen. Then, the screen illustrated in FIG. 8A is closed, and the screen illustrated in FIG. 7 is displayed on the operation unit 220.

Figure 8B:
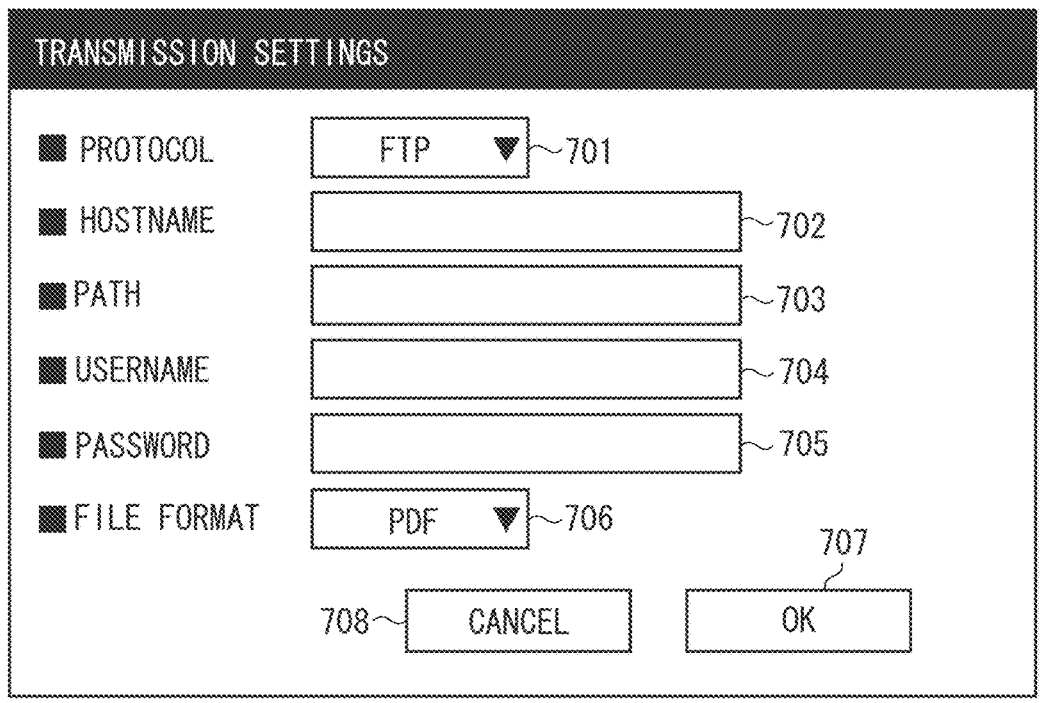

FIG. 8B is a diagram illustrating an example of an operation screen displayed on the operation unit 220. The operation screen illustrated in FIG. 8B is displayed if FTP is selected in the area 601 of FIG. 8A.

An area 701 is an area for accepting the selection of the transmission protocol. The area 701 indicates that FTP is selected. Areas 702 to 706 are similar to the areas 602 to 606. A detailed description thereof will thus be omitted. If an OK key 707 is pressed, the CPU 211 stores the transmission settings accepted via the screen into the HDD 214. Then, the screen illustrated in FIG. 8B is closed, and the screen illustrated in FIG. 7 is displayed on the operation unit 220. In this case, the screen illustrated in FIG. 7 may display the contents of the transmission settings made from the screen illustrated in FIG. 8B. If a cancel key 708 is pressed, the CPU 211 discards the transmission settings accepted via the screen. Then, the screen illustrated in FIG. 8B is closed, and the screen illustrated in FIG. 7 is displayed on the operation unit 220.

Figure 9A:
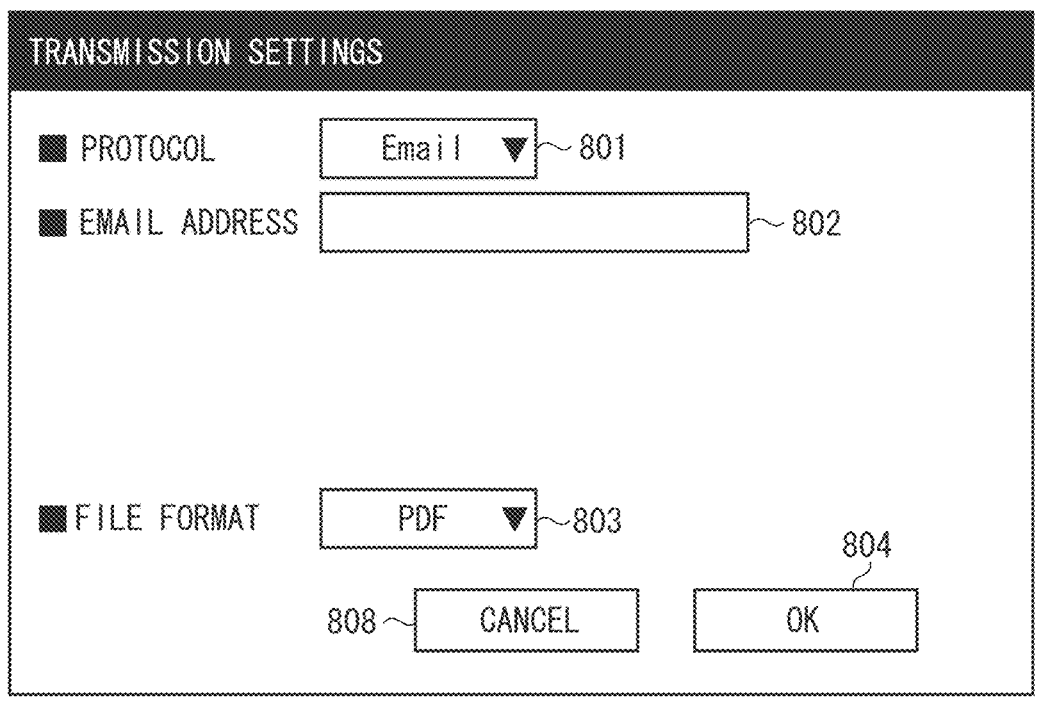
FIGS. 9A and 9B are diagrams illustrating operation screens of the MFP according to the exemplary embodiment of the present invention.

FIG. 9A is a diagram illustrating an example of an operation screen displayed on the operation unit 220. The operation screen illustrated in FIG. 9A is displayed if email is selected in the area 601 of FIG. 8A.

An area 801 is an area for accepting the selection of the transmission protocol. The area 801 indicates that email is selected. An area 802 is an area for accepting an email address serving as the destination of the email. An area 803 is an area for accepting the selection of the file format. The area 803 displays a drop-down list of options including PDF and TIFF. The options may include other file formats. If an OK key 807 is pressed, the CPU 211 stores the transmission settings accepted via the screen into the HDD 214. Then, the screen illustrated in FIG. 9A is closed, and the screen illustrated in FIG. 7 is displayed on the operation unit 220. In this case, the screen illustrated in FIG. 7 here may display the contents of the transmission settings made from the screen illustrated in FIG. 9A. If a cancel key 808 is pressed, the CPU 211 discards the transmission settings accepted via the screen. Then, the screen illustrated in FIG. 9A is closed, and the screen illustrated in FIG. 7 is displayed on the operation unit 220.

Figure 9B:
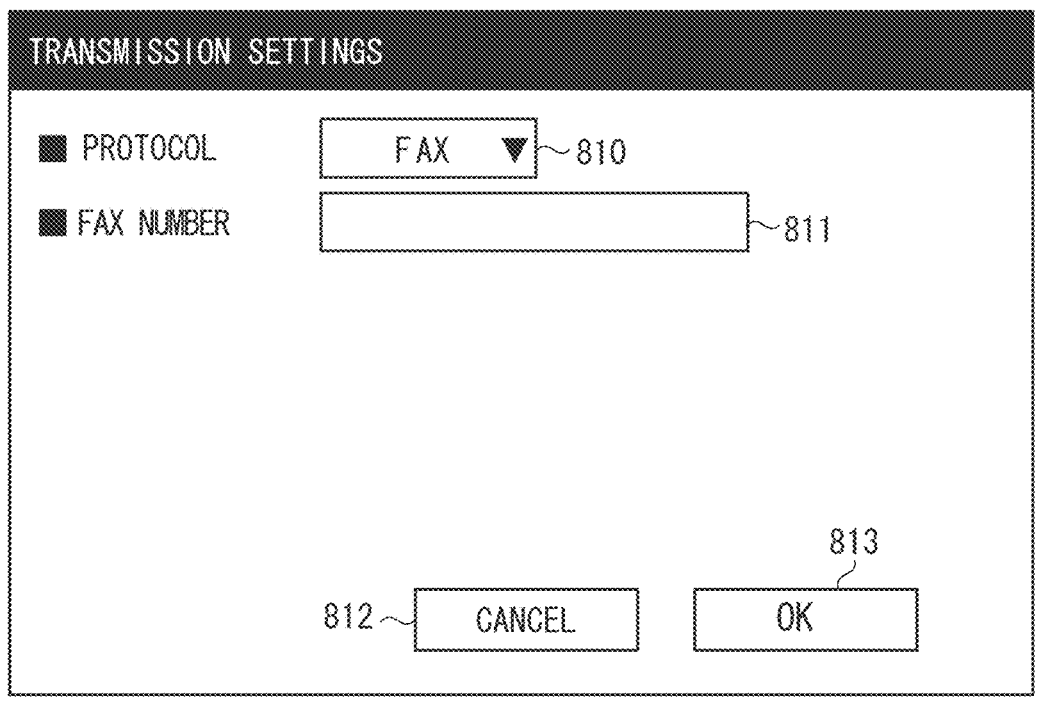

FIG. 9B is a diagram illustrating an example of an operation screen displayed on the operation unit 220. The operation screen illustrated in FIG. 9B is displayed if FAX is selected in the area 601 of FIG. 8A.

An area 810 is an area for accepting the selection of the transmission protocol. The area 810 indicates that FAX is selected. An area 811 is an area for accepting a FAX number serving as the destination of the FAX. If an OK key 813 is pressed, the CPU 211 stores the transmission settings accepted via the screen into the HDD 214. Then, the screen illustrated in FIG. 9B is closed, and the screen illustrated in FIG. 7 is displayed on the operation unit 220. In this case, the screen illustrated in FIG. 7 may display the contents of the transmission settings made from the screen illustrated in FIG. 9B. If a cancel key 812 is pressed, the CPU 211 discards the transmission settings accepted via the screen. Then, the screen illustrated in FIG. 9B is closed, and the screen illustrated in FIG. 7 is displayed on the operation unit 220.

Referring back to the flowchart of FIG. 6, after the settings are accepted in step S2002, the processing proceeds to step S2003. In step S2003, the CPU 211 determines whether a transmission start instruction is accepted. The transmission start instruction is accepted according to pressing of a start key on the operation unit 220. If the transmission start instruction is accepted (YES in step S2003), the processing proceeds to step S2004.

In step S2004, the CPU 211 updates a transmission history database illustrated in FIG. 10. The transmission history database illustrated in FIG. 10 is stored in the HDD 214. The transmission history database can store a plurality of transmission histories (execution histories of transmission jobs). The transmission history database includes the columns such as a start time 901, a destination address 902, a protocol 903, a serial number 904, a communication result 905, a file format 906, a username 907, and an output flag 908. In the transmission history database, one transmission history record is created and managed for each transmission job.

The start time 901 indicates the time when the execution of the transmission job is started. More specifically, numerals indicating year, month, day, and time in such order are stored as information indicating transmission time. While year, month, day, and time are described to be all included in the start time 901, year may be omitted. The start time 901 may include only month and day. The start time 901 has only to include at least any one of the pieces of time information about year, month, day, and time. A character string representing the day of the week may be included. The user may be able to set which of the pieces of time information to store, via the operation unit 220.

The destination address 902 indicates the address of the transmission destination of the data. The protocol 903 indicates the transmission protocol that has been used to transmit the data. The serial number 904 indicates the number uniquely assigned to each record. The communication result 905 indicates whether the data is successfully transmitted. The file format 906 indicates that the data to be transmitted is converted into and transmitted in which file format. The username 907 indicates the name of the user that has instructed to transmit the data. The output flag 908 indicates whether each record has been output (transmitted or printed) to an external apparatus.

Figure 11:
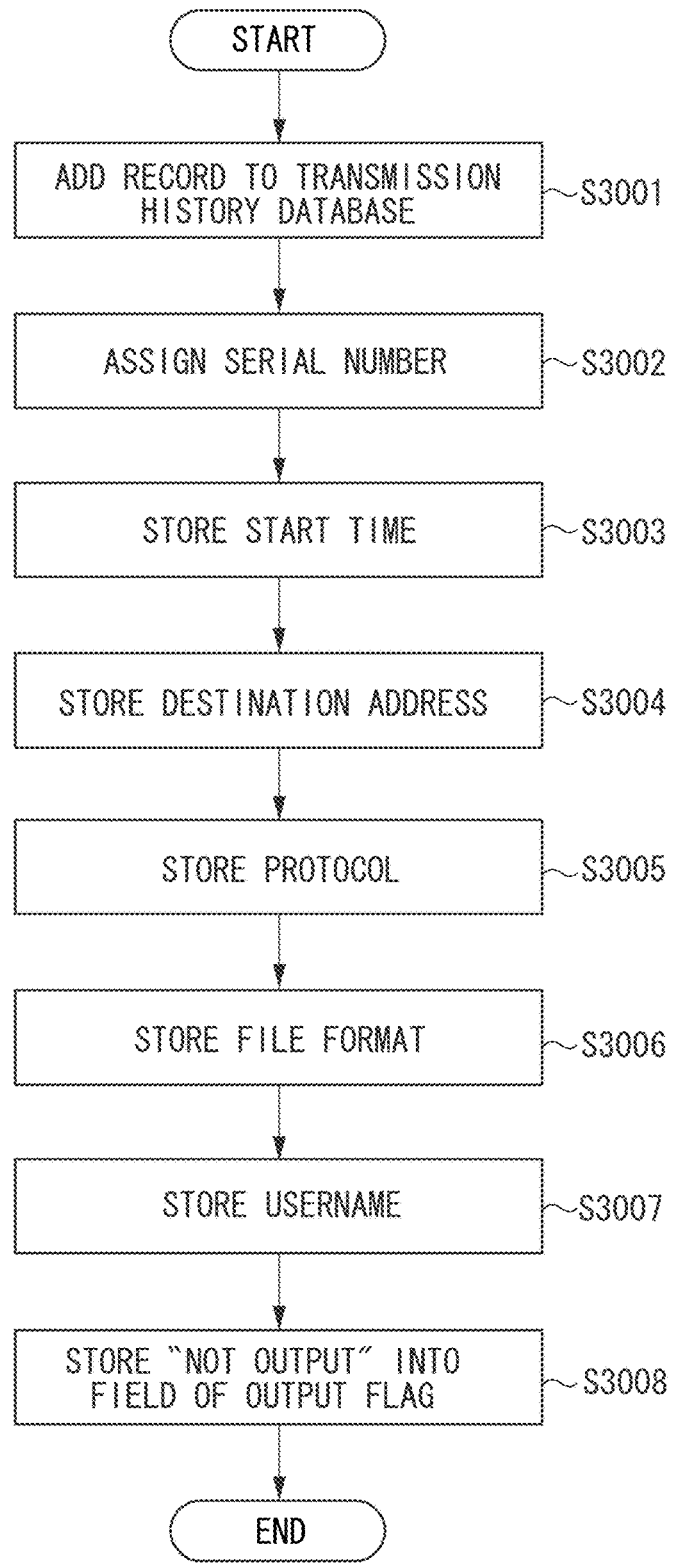
FIG. 11 is a flowchart illustrating an operation of the MFP according to the exemplary embodiment of the present invention.

In step S2004, the CPU 211 updates such a transmission history database. FIG. 11 illustrates details of the processing performed in step S2004.

In step S3001 of FIG. 11, the CPU 211 initially adds a record to the transmission history database of FIG. 10.

In step S3002, the CPU 211 assigns to the record a number that can uniquely identify the record. The number is assigned to the field of the serial number 904. More specifically, the CPU 211 adds 1 to the largest serial number among those stored in the transmission history database, and stores the resulting serial number into the field of the serial number 904 of the record created in step S3001.

In step S3003, the CPU 211 obtains the current time from the timer 230, and stores the obtained time into the field of the start time 901.

In step S3004, the CPU 211 stores the destination set by using any one of the operation screens illustrated in FIGS. 8A to 9B into the field of the destination address 902. If the transmission protocol is SMB, the hostname set in the hostname 602 is stored into the field of the destination address 902. If the transmission protocol is FTP, the hostname set in the hostname 702 is stored into the field of the destination address 902. If the transmission protocol is email, the email address set in the email address 802 is stored into the field of the destination address 902. If the transmission protocol is FAX, the FAX number set in the FAX number 811 is stored into the field of the destination address 902.

In step S3005, the CPU 211 stores the transmission protocol selected in the area 601 of FIG. 8A, the area 701 of FIG. 8B, the area 801 of FIG. 9A, or the area 810 of FIG. 9B, into the field of the protocol 903.

In step S3006, the CPU 211 stores the file format selected in the area 606 of FIG. 8A, the area 706 of FIG. 8B, or the area 803 of FIG. 9A, into the field of the file formation 906. If the transmission protocol is FAX, the field of the file format 906 is left blank.

In step S3007, the CPU 211 stores the username of the user using the MFP 101 into the field of the username 907. In the present exemplary embodiment, the username of the user logged in to the MFP 101, stored in the RAM 213 in step S1005, is stored into the field of the username 907.

In step S3008, the CPU 211 stores a value indicating "not output" into the field of the output flag 908. This value indicates that the record is not yet included into a file (a file including the record is not yet generated) or transmitted as a communication management report to an external apparatus. If a file of the record is generated and output as a communication management report to an external apparatus, the CPU 211 updates the value of the output flag 908 from "not output" to "output".

After the end of the processing of step S3008, the processing proceeds to step S2005 of FIG. 6.

In step S2005, the CPU 211 instructs the scanner 222 to read a document according to the read settings accepted via the screen illustrated in FIG. 7, whereby reading of the document is started. The scanner 222 reads the document, generates image data on the document, and transmits the generated image data to the CPU 211. The CPU 211 receives the image data transmitted from the scanner 222, and stores the received image data into the HDD 214.

In step S2006, the CPU 211 transmits the image data stored in the HDD 214 to the destination designated by the destination address set by using any one of the operation screens illustrated in FIGS. 8A to 9B, according to the transmission protocol set by using the one of the operation screens illustrated in FIGS. 8A to 9B. If the SMB protocol is selected on the screen of FIG. 8A, the CPU 211 logs in to the destination expressed by connecting the value input to the hostname 602 and the value input to the path 603, by using the value input to the username 604 and the value input to the password 605. The CPU 211 converts the image data stored in the HDD 214 into the file format selected in the file format 606. The CPU 211 then transmits the converted file to the logged-in destination by using the network I/F 219. Such a job will be referred to as an SMB transmission job. If the FTP protocol is selected on the screen of FIG. 8B, the CPU 211 logs in to the destination expressed by connecting the value input to the hostname 702 and the value input to the path 703, by using the value input to the username 704 and the value input to the password 705. The CPU 211 converts the image data stored in the HDD 214 into the file format selected in the file format 706. The CPU 211 then transmits the converted file to the logged-in destination by using the network I/F 219. Such a job will be referred to as an FTP transmission job. If the email protocol is selected on the screen of FIG. 9A, the CPU 211 converts the image data stored in the HDD 214 into the file format selected in the file format 803. The CPU 211 then transmits an email to which the converted file is attached to the destination input to the email address 802 by using the network I/F 219. Such a job will be referred to as an email transmission job. If the FAX protocol is selected on the screen of FIG. 9B, the CPU 211 transmits the image data stored in the HDD 214 to the destination input to the FAX number 811 by using the modem 223. Such a job will be referred to as a FAX transmission job.

In step S2007, the CPU 211 determines whether the transmission of the image data has been completed. If the CPU 211 determines that the transmission of the image data is not completed (NO in step S2007), the processing returns to step S2006, and the CPU 211 continues transmitting the image data. On the other hand, if the CPU 211 determines that the transmission of the image data is completed (YES in step S2007), the processing proceeds to step S2008.

In step S2008, the CPU 211 determines whether the image data is successfully transmitted. More specifically, if a response indicating normal reception of the image data is received from the destination apparatus, the CPU 211 determines that the image data is successfully transmitted. On the other hand, if the response indicating normal reception of the image data is not received from the destination apparatus during a certain period of time, the CPU 211 determines that the transmission of the image data is failed. If the CPU 211 determines that the image data is successfully transmitted (YES in step S2008), the processing proceeds to step S2009. If the CPU 211 determines that the transmission of the image data is failed (NO in step S2008), the processing proceeds to step S2011.

In step S2009, the CPU 211 stores "OK", which indicates successful transmission, into the field of the communication result 905 of the transmission history database.

In step S2011, the CPU 211 stores "NG", which indicates failed transmission, into the field of the communication result 905 of the transmission history database.

In step S2010, the CPU 211 adds 1 to the value of a record counter stored in the HDD 214. The record counter is used to identify the total number of records each of which the output flag 908 is in the state of "not output" among the records stored in the transmission history database. The record counter is set to 0 at the time of factory shipment. The record counter is then counted up each time a transmission job is executed.

In step S2012, the CPU 211 determines whether the transmission of the image data performed in step S2006 is by FAX (i.e., FAX transmission job). More specifically, the CPU 211 determines whether the image data is transmitted to the destination specified by the FAX number 811 input on the screen illustrated in FIG. 9B, by FAX which is selected by the protocol 810. If the CPU 211 determines that the transmission of the image data performed in step S2006 is by FAX (YES in step S2012), the processing proceeds to step S2013. On the other hand, if the CPU 211 determines that the transmission of the image data performed in step S2006 is not by FAX (NO in step S2012), the processing skips step S2013. Then, the processing illustrated in the flowchart of FIG. 6 ends.

In step S2013, the CPU 211 adds 1 to a FAX counter stored in the HDD 214. The FAX counter is used to identify the total number of records of FAX transmission jobs each of which the output flag 908 is "not output" among the records stored in the transmission history database. The FAX counter is set to 0 at the time of factory shipment. The FAX counter is then counted up each time a FAX transmission job is executed.

In such a manner, the MFP 101 executes transmission jobs for transmitting data to specified destinations.

The MFP 101 stores the execution history of the executed transmitted jobs as the transmission history database in the HDD 214. If the MFP 101 accepts a request to display the history of transmission jobs from the operation unit 220, the MFP 101 displays the history of transmission jobs stored in the transmission history database illustrated in FIG. 10 on the display unit of the operation unit 220. The MFP 101 also prints the history of transmission jobs stored in the transmission history database illustrated in FIG. 10 as a communication management report.

The administrator of the MFP 101 can thus check who executed what transmission job on the MFP 101 when and what the communication result was.

The MFP 101 according to the present exemplary embodiment can further generate and transmit a file of the communication management report or a file of a FAX management report based on the history of transmission jobs stored in the transmission history database illustrated in FIG. 10. The communication management report is a report that covers the execution history of transmission jobs performed based on all the transmission protocols (SMB, FTP, email, and FAX) executable by the MFP 101. The FAX management report is a report that does not cover the execution history of SMB, FTP, or email transmission jobs, and describes only the execution history of FAX transmission jobs. In other words, the FAX management report includes the execution history of one type of job.

To manage the execution history of all types of jobs, the administrator can make a setting to output the communication management report. If the administrator wants to separately manage the execution history of FAX transmission jobs and the execution history of other types of jobs, the administrator can make a setting to output the FAX management report. FAX is likely to be used to handle confidential documents. The function of outputting the FAX management report is therefore useful if special care is needed to manage the execution history of FAX transmission jobs.

Now, processing by which the MFP 101 generates and transmits the file of the communication management report or the file of the FAX management report based on the history of transmission jobs stored in the transmission history database illustrated in FIG. 10 will be described.

FIG. 12A illustrates an operation screen for setting an output method of the communication management report. This operation screen is a screen displayed on the operation unit 220 of the MFP 101. The operation screen of FIG. 12A includes a print key 1301, a transmission key 1302, an OFF key 1303, and a communication number specification field

1308. The user operates such items to make settings for outputting a communication management report according to the number of records of the "not output" state, counted in step S2010.

The print key 1301 is a key for specifying that the communication management report be printed if the number of stored records of the "not output" state, counted in step S2010, is as many as the number specified in the communication number specification field 1308. The transmission key 1302 is a key for specifying that the communication management report be transmitted if the number of stored records of the "not output" state, counted in step S2010, is as many as the number specified in the communication number specification field 1308. The user inputs the value in the communication number specification field 1308 via a software keyboard which is displayed when a button 1307 is selected. The OFF key 1303 is a key for disabling both the function of printing the communication management report according to the number of records of the "not output" state and the function of transmitting the communication management report according to the number of records of the "not output" state.

The operation screen of FIG. 12A also includes a print key 1304, a transmission key 1305, an OFF key 1306, and a time specification field 1310. The user operates such items to make settings for outputting the communication management report if the time measured by the timer 230 has reached predetermined time. The print key 1304 is a key for specifying that the communication management report be printed if the time measured by the timer 230 has reached the time specified in the time specification field 1310. The transmission key 1305 is a key for specifying that the communication management report be transmitted if the time measured by the timer 230 has reached the time specified in the time specification field 1310. The OFF key 1306 is a key for disabling the functions of outputting the communication management report if the time measured by the timer 230 has reached the time specified in the time specification field 1310. A transmission destination field 1313 is a field for specifying the transmission destination of the communication management report. The user inputs the transmission destination in the transmission destination field 1313 via a software keyboard which is displayed when a transmission destination button 1312 is selected.

If an OK key 1315 is pressed, the CPU 211 stores the settings accepted via the screen illustrated in FIG. 12A into the HDD 214. The CPU 211 then closes the screen illustrated in FIG. 12A. If a cancel key 1314 is pressed, the CPU 211 discards the settings accepted via the screen. The CPU 211 then closes the screen illustrated in FIG. 12A.

FIG. 12B illustrates an operation screen for setting an output method of the FAX management report. This operation screen is a screen displayed on the operation unit 220 of the MFP 101.

The operation screen of FIG. 12B includes a print key 1401, a transmission key 1402, an OFF key 1403, and a communication number specification field 1408. The user operates such items to make settings for outputting a FAX management report according to the number of records of the "not output" state, counted in step S2013.

The print key 1401 is a key for specifying that the FAX management report be printed if the number of stored records of the "not output" state, counted in step S2013, is as many as the number specified in the communication number specification field 1408. The transmission key 1402 is a key for specifying that the FAX management report be transmitted if the number of stored records of the "not output" state, counted in step S2013, is as many as the number specified in the communication number specification field 1408. The user inputs the value of the communication number specification field 1408 via a software keyboard which is displayed when a button 1407 is selected. The OFF key 1403 is a key for disabling both the function of printing the FAX management report according to the number of records of the "not output" state and the function of transmitting the FAX management report according to the number of records of the "not output" state.

The operation screen of FIG. 12B also includes a print key 1404, a transmission key 1405, an OFF key 1406, and a time specification field 1410. The user operates such items to make settings for outputting the FAX management report if the time measured by the timer 230 has reached predetermined time.

The print key 1404 is a key for specifying that the FAX management report be printed if the time measured by the timer 230 has reached the time specified in the time specification field 1410. The transmission key 1405 is a key for specifying that the FAX management report be transmitted if the time measured by the timer 230 has reached the time specified in the time specification field 1410. The OFF key 1406 is a key for disabling the functions of outputting the FAX management report if the time measured by the timer 230 has reached the time specified in the time specification field 1410. A transmission destination field 1413 is a field for specifying the transmission destination of the FAX management report. The user inputs the transmission destination in the transmission destination field 1413 via a software keyboard which is displayed when a transmission destination button 1412 is selected.

If an OK key 1415 is pressed, the CPU 211 stores the settings accepted via the screen of FIG. 12B into the HDD 214. The CPU 211 then closes the screen illustrated in FIG. 12B. If a cancel key 1414 is pressed, the CPU 211 discards the settings accepted via the screen. The CPU 211 then closes the illustrated in FIG. 12B.

The CPU 211 outputs (transmits or prints) the communication management report according to the settings accepted via the operation screen of FIG. 12A. Details of such processing will be described with reference to the flowcharts of FIGS. 13 and 14. The processing illustrated in the flowcharts of FIGS. 13 and 14 is implemented by the CPU 211 reading a program stored in the ROM 212 into the RAM 213 and executing the program.

Figure 13:
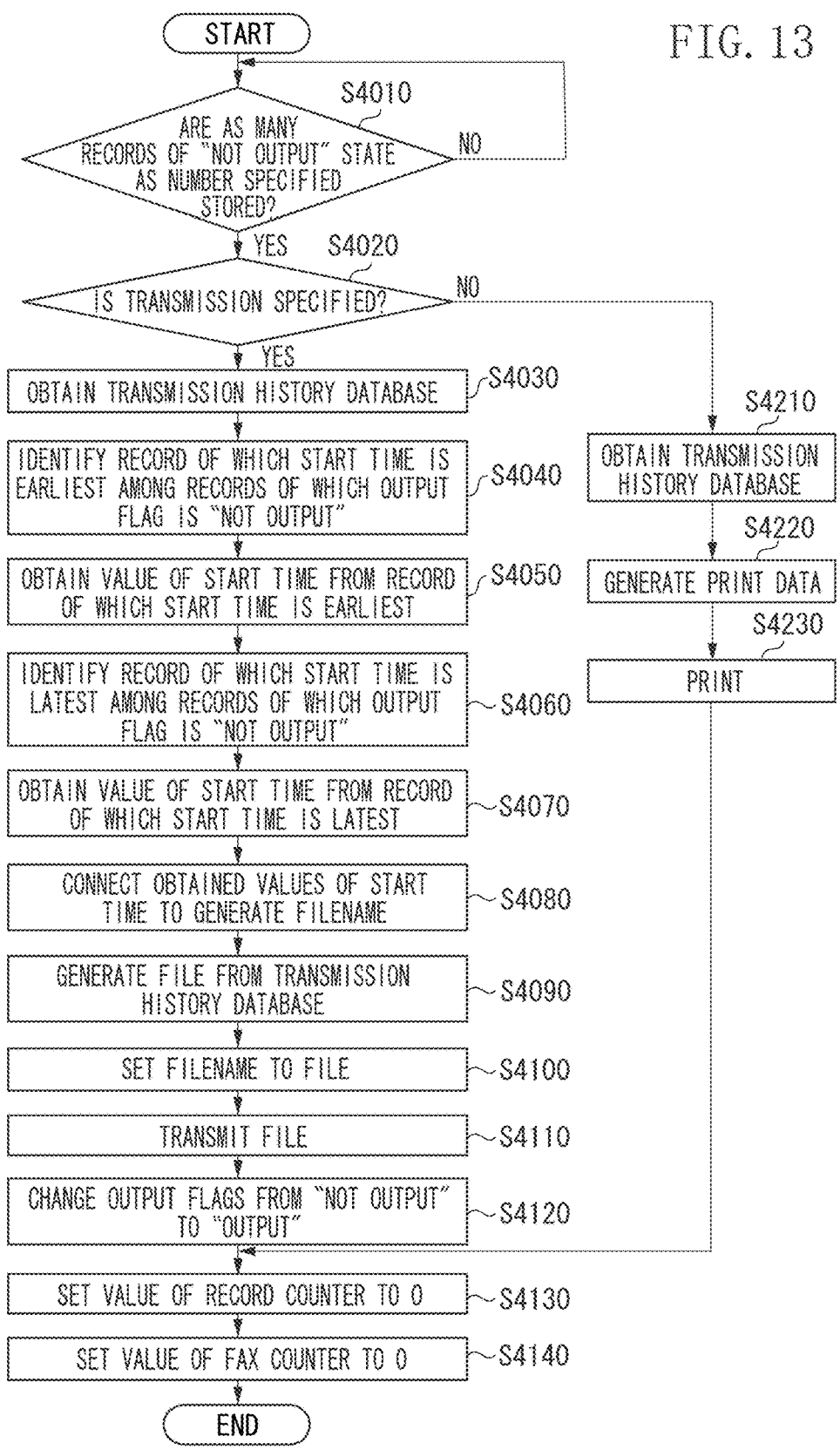
FIG. 13 is a flowchart illustrating an operation of the MFP according to the exemplary embodiment of the present invention.
Figure 14:
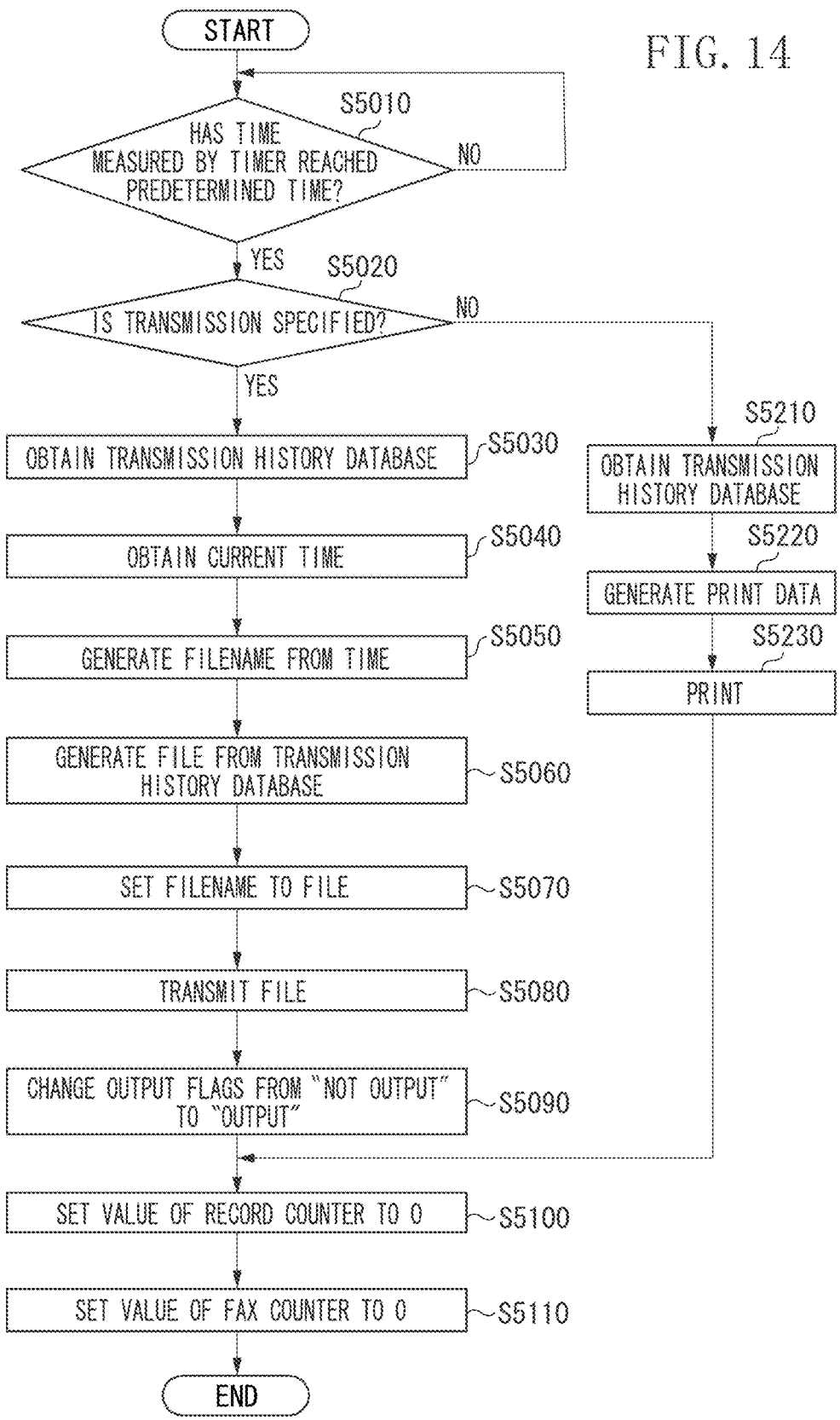
FIG. 14 is a flowchart illustrating an operation of the MFP according to the exemplary embodiment of the present invention.

The processing illustrated in the flowchart of FIG. 13 is performed if the print key 1301 or the transmission key 1302 of FIG. 12A is specified. In other words, if the OFF key 1303 of FIG. 12A is specified, the processing illustrated in the flowchart of FIG. 13 is not performed. The processing illustrated in the flowchart of FIG. 14 is performed if the print key 1304 or the transmission key 1305 of FIG. 12A is specified. In other words, if the OFF key 1306 of FIG. 12A is specified, the processing illustrated in the flowchart of FIG. 14 is not performed. If the processing illustrated in the flowchart of FIG. 13 and the processing illustrated in the flowchart of FIG. 14 are both performed, the CPU 211 alternately and continuously performs the processing of step S4010 in the flowchart of FIG. 13 and that of step S5010 in the flowchart of FIG. 14.

In step S4010, the CPU 211 determines whether as many records of the "not output" state as the number specified in the communication number specification field 1308 are stored among the records of the transmission jobs of all the protocols stored in the transmission history database illustrated in FIG. 10. More specifically, the CPU 211 determines whether the number of stored records of the "not output" state, counted in step S2010, is as many as the number specified in the communication number specification field 1308. If the CPU 211 determines that as many records of the "not output" state as the number specified in the communication number specification field 1308 are not be stored (NO in step S4010), the CPU 211 repeats the processing of step S4010. On the other hand, if the CPU 211 determines that as many records of the "not output" state as specified in the communication number specification field 1308 are stored (YES in step S4010), the processing proceeds to step S4020.

In step S4020, the CPU 211 determines whether transmission is specified by the transmission key 1302 on the screen illustrated in FIG. 12A. If the CPU 211 determines that transmission is specified by the transmission key 1302 (YES in step S4020), the processing proceeds to step S4030. On the other hand, if the print key 1301 is specified, the CPU 211 determines that transmission is not specified (NO in step S4020), and the processing proceeds to step S4210.

In step S4030, the CPU 211 obtains the transmission history database illustrated in FIG. 10 from the HDD 214. The CPU 211 stores the obtained transmission history database into the RAM 213.

In step S4040, the CPU 211 identifies a record each of which the start time 901 is the earliest among records each of which the output flag 908 is "not output" in the transmission history database.

In step S4050, the CPU 211 obtains the value of the start time 901 from the record of which the start time 901 is the earliest. The CPU 211 stores the obtained value into the RAM 213.

In step S4060, the CPU 211 identifies a record of which the start time 901 is the latest among the records each of which the output flag 908 is "not output" in the transmission history database.

In step S4070, the CPU 211 obtains the value of the start time 901 from the record of which the start time 901 is the latest. The CPU 211 stores the obtained value into the RAM 213.

In step S4080, the CPU 211 connects the value of the start time 901 obtained in step S4050 and the value of the start time 901 obtained in step S4070 with a hyphen to generate a character string representing a filename. Such processing will be referred to as filename generation processing.

A specific example of the filename generation processing will be described. If the CPU 211 generates a filename from the transmission history database illustrated in FIG. 10, the filename is generated in the following manner. First, the CPU 211 obtains the value "201503160948" of the start time 901 of the record of which the start time 901 is the earliest among the records each of which the output flag 908 is "not output". Then, the CPU 211 obtains the value "201503161405" of the start time 901 of the record of which the start time 901 is the latest among the records each of which the output flag 908 is "not output". Then, the CPU 211 connects the values with a hyphen to generate a filename "201503160948-201503161405". Further, the CPU 211 may attach a filename extension to the end, like "201503160948-201503161405.csv". This makes it easy for the administrator who manages transmission histories to search for a file storing the transmission history to be viewed. For example, if the administrator wants to view a transmission history of a job transmitted around 11:00, Mar. 16, 2015, the administrator can easily find out from the filename "201503160948-201503161405.csv" that the transmission result can be viewed by opening the file.

In step S4090, the CPU 211 extracts the records each of which the output flag 908 is "not output" from the transmission history database stored in the RAM 213 in step S4030, and generates a csv file including the extracted records.

In step S4100, the CPU 211 sets the filename generated in step S4080 as that of the file generated in step S4090.

In step S4110, the CPU 211 attaches the file (communication management report) generated in step S4090 to an email and transmits the email to the transmission destination specified in the transmission destination field 909. The transmission method may be FTP-based or SMB-based file transmission. More specifically, if an email address is specified in the transmission destination field 1313, the CPU 211 transmits the file by email. If a hostname of a server is specified, the CPU 211 transmits the file to the server by FTP or SMB.

In step S4120, the CPU 211 changes the output flags 908 of the file-generated, transmission-completed records in the transmission history database stored in the HDD 214 from "not output" to "output".

In step S4130, the CPU 211 sets the value of the record counter to 0. In step S4140, the CPU 211 sets the value of the FAX counter to 0. Then, the processing illustrated in the flowchart of FIG. 13 ends. After the end of the processing, the CPU 211 repeats the processing of step S4010 again.

On the other hand, when the processing proceeds from step S4020 to step S4210, in step S4210, the CPU 211 obtains the transmission history database illustrated in FIG. 10 from the HDD 214. Then, the CPU 211 stores the obtained transmission history database into the RAM 213.

In step S4220, the CPU 211 extracts the records each of which the output flag 908 is "not output" in the transmission history database illustrated in FIG. 10, and generates image data for printing (print data) including the extracted records.

In step S4230, the CPU 211 transmits the print data generated in step S4220 to the printer 221, and causes the printer 221 to perform printing based on the print data. Then, the processing proceeds to step S4130.

Described above is the processing by which the MFP 101 outputs the communication management report on condition that as many records of the "not output" state as the number specified in the communication number specification field 1308 are stored among the records of the transmission jobs of all the protocols stored in the transmission history database illustrated in FIG. 10.

FIG. 14 is a flowchart illustrating the processing by which the MFP 101 outputs a communication management report if the time measured by the timer 230 has reached a predetermined time.

In step S5010, the CPU 211 determines whether the time measured by the timer 230 has reached the predetermined time. If the CPU 211 determines that the time measured by the timer 230 has reached the predetermined time (YES in step S5010), the processing proceeds to step S5020. If the CPU 211 determines that the time measured by the timer 230 has not reached the predetermined time (NO in step S5010), the CPU 211 repeats the processing of step S5010.

In step S5020, the CPU 211 determines whether transmission is specified by the transmission key 1305 on the screen illustrated in FIG. 12A. If the CPU 211 determines that transmission is specified (YES in step S5020), the processing proceeds to step S5030. On the other hand, if the print key 1304 is specified, the CPU 211 determines that transmission is not specified (NO in step S5020), and the processing proceeds to step S5210.

In step S5030, the CPU 211 obtains the transmission history database illustrated in FIG. 10 from the HDD 214. The CPU 211 stores the obtained transmission history database into the RAM 213.

In step S5040, the CPU 211 obtains and stores the current time measured by the timer 230 into the RAM 213.

In step S5050, the CPU 211 generates a filename from the time stored in the RAM 213 in step S5040, and stores the generated filename into the RAM 213. For example, if the time when the processing of step S5040 is performed is 15:00, Mar. 16, 2015, the CPU 211 generates a filename "201503161500".

In step S5060, the CPU 211 extracts records each of which the output flag 908 is "not output" from the transmission history database stored in the RAM 213 in step S5030, and generates a csv file including the extracted records.

In step S5070, the CPU 211 sets the filename generated in step S5050 as that of the file generated in step S5060.

In step S5080, the CPU 211 attaches the file (communication management report) generated in step S5070 to an email and transmits the email to the transmission destination specified in the transmission destination field 1313. The transmission method may be FTP-based or SMB-based file transmission. More specifically, if an email address is specified in the transmission destination field 1313, the CPU 211 transmits the file by email. If a hostname of a server is specified, the CPU 211 transmits the file to the server by FTP or SMB.

In step S5090, the CPU 211 changes the output flags 908 of the transmission-completed records in the transmission history database stored in the HDD 214 from "not output" to "output".

In step S5100, the CPU 211 sets the value of the record counter to 0. In step S5110, the CPU 211 sets the value of the FAX counter to 0. Then, the processing illustrated in the flowchart of FIG. 14 ends. After the end of the processing, the CPU 211 repeats the processing of step S5010 again.

When the processing proceeds from step S5020 to step S5210, in step S5210, the CPU 211 obtains the transmission history database illustrated in FIG. 10 from the HDD 214. The CPU 211 stores the obtained transmission history database into the RAM 213.

In step S5220, the CPU 211 extracts the records each of which the output flag 908 is "not output" from the transmission history database stored in the RAM 213 in step S5210, and generates image data for printing (print data) including the extracted records.

In step S5230, the CPU 211 transmits the print data generated in step S5220 to the printer 221, and causes the printer 221 to perform printing based on the print data. Then, the processing proceeds to step S5100.

The above is the processing by which the MFP 101 outputs the communication management report if the time measured by the timer 230 has reached the predetermined time.

Next, processing by which the CPU 211 outputs (transmits or prints) a FAX management report according to the settings accepted via the operation screen of FIG. 12B will be described with reference to the flowcharts illustrated in FIGS. 15 and 16. The processing illustrated in the flowcharts of FIGS. 15 and 16 is implemented by the CPU 211 reading a program stored in the ROM 212 into the RAM 213 and executing the program.

Figure 15:
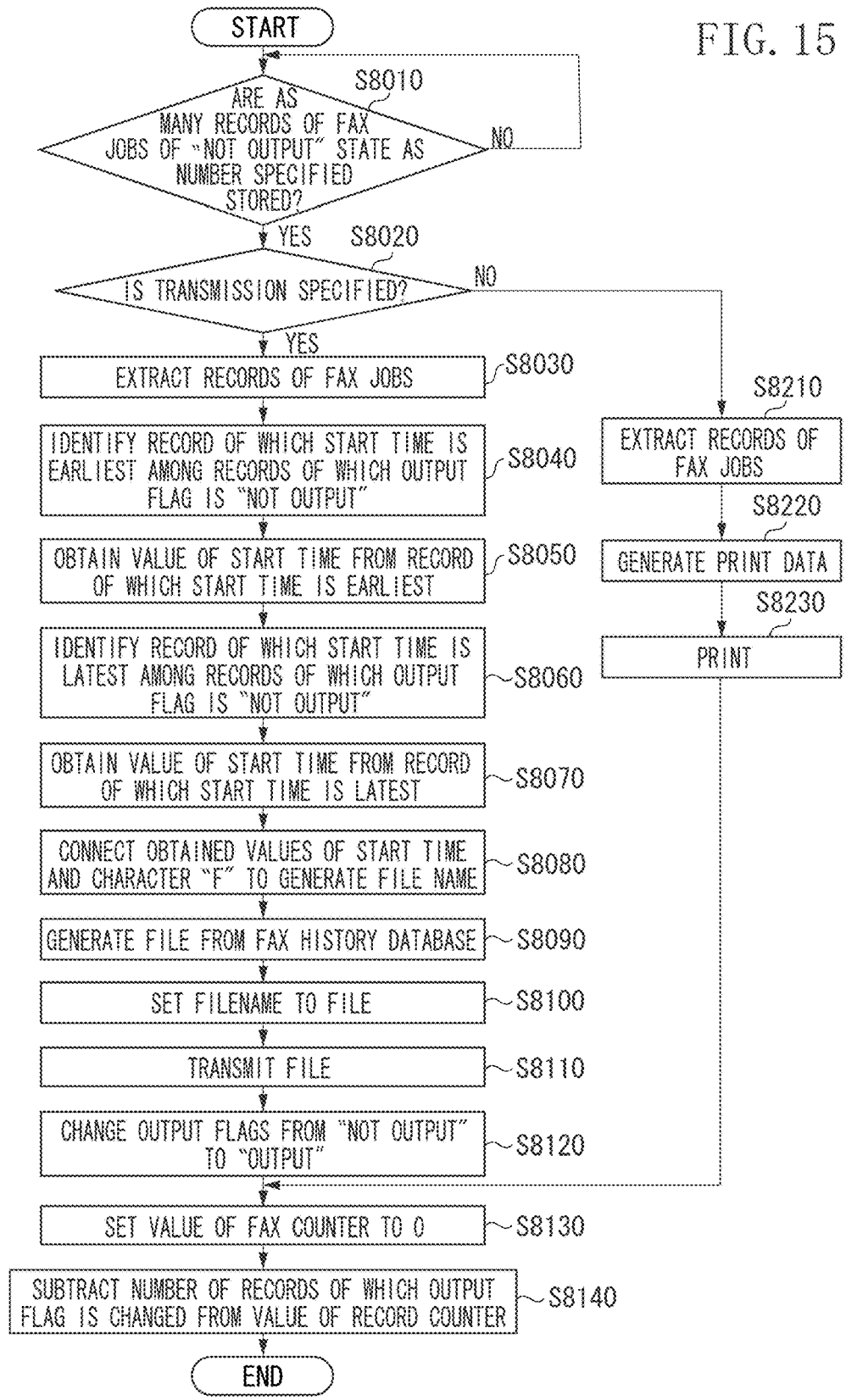
FIG. 15 is a flowchart illustrating an operation of the MFP according to the exemplary embodiment of the present invention.
Figure 16:
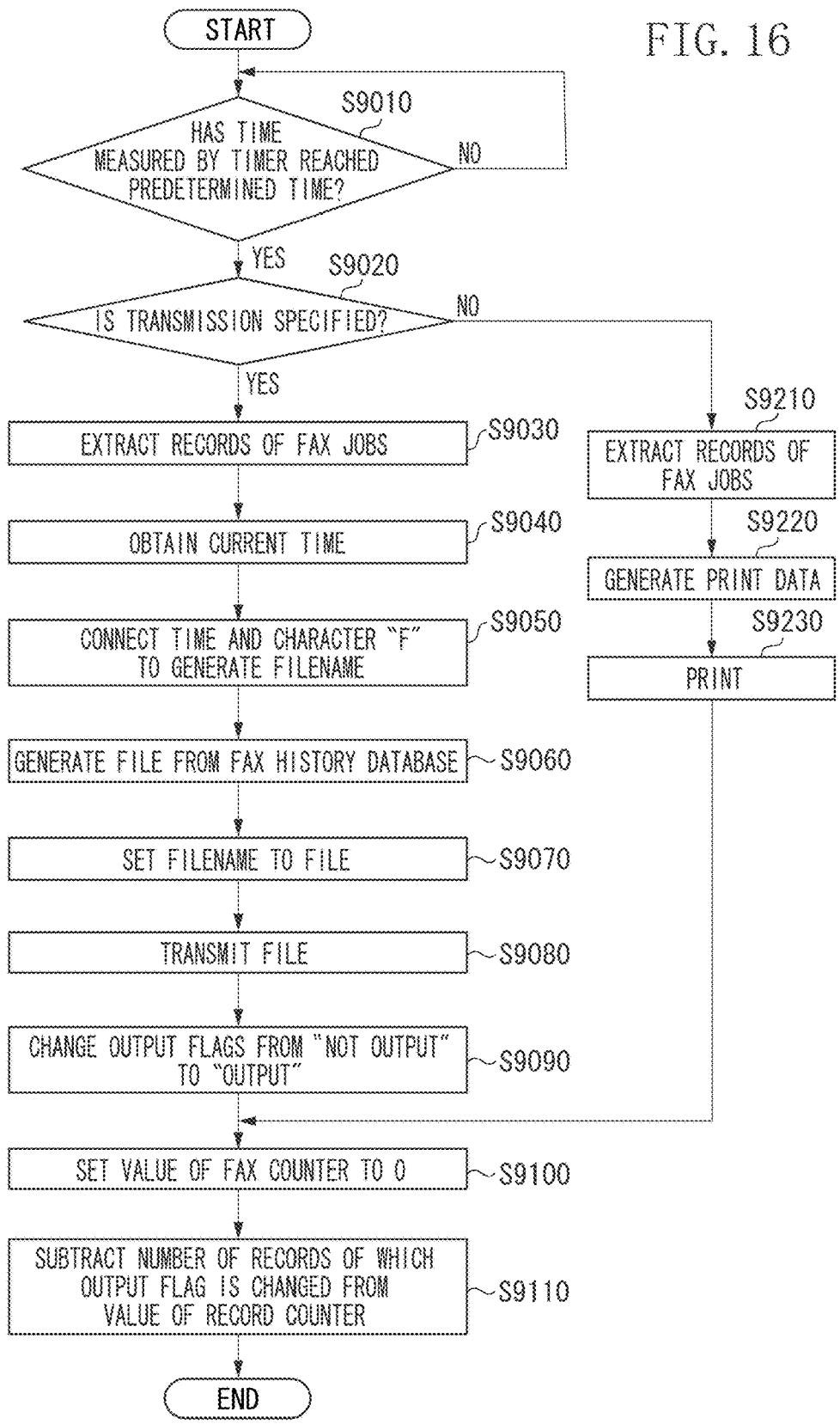
FIG. 16 is a flowchart illustrating an operation of the MFP according to the exemplary embodiment of the present invention.

The processing illustrated in the flowchart of FIG. 15 is performed if the print key 1401 or the transmission key 1402 of FIG. 12B is specified. In other words, if the OFF key 1403 of FIG. 12B is specified, the processing illustrated in the flowchart of FIG. 15 is not performed. The processing illustrated in the flowchart of FIG. 16 is performed if the print key 1404 or the transmission key 1405 of FIG. 12B is specified. In other words, if the OFF key 1406 of FIG. 12B is specified, the processing illustrated in the flowchart of FIG. 16 is not performed. If the processing illustrated in the flowchart of FIG. 15 and the processing illustrated in the flowchart of FIG. 16 are both performed, the CPU 211 alternately and continuously performs the processing of step S8010 in the flowchart of FIG. 15 and the processing of step S9010 in the flowchart of FIG. 16.

In step S8010, the CPU 211 determines whether as many records of execution history of FAX jobs of the "not output" state as the number specified in the communication number specification field 1408 are stored among the records of the transmission jobs of all the protocols stored in the transmission history database illustrated in FIG. 10. More specifically, the CPU 211 determines whether the number of stored records of execution history of FAX jobs of the "not output" state among the records of the transmission jobs of all the protocols stored in the transmission history database illustrated in FIG. 10 is as many as the number specified in the communication number specification field 1408. If the CPU 211 determines that the number of stored records of execution history of FAX jobs of the "not output" state is not as many as the number specified in the communication number specification field 1408 (NO in step S8010), the CPU 211 repeats the processing of step S8010. On the other hand, if the CPU 211 determines that the number of stored records of execution history of FAX jobs of the "not output" state is as many as the number specified in the communication number specification field 1408 (YES in step S8010), the processing proceeds to step S8020.

In step S8020, the CPU 211 determines whether transmission is specified by the transmission key 1402 on the screen illustrated in FIG. 12B. If the CPU 211 determines that transmission is specified by the transmission key 1402 (YES in step S8020), the processing proceeds to step S8030. On the other hand, if the print key 1401 is specified, the CPU 211 determines that transmission is not specified (NO in step S8020), and the processing proceeds to step S8210.

In step S8030, the CPU 211 extracts only the records of FAX jobs each of which the value of the protocol 903 is FAX from the transmission history database illustrated in FIG. 10. The CPU 211 stores the extracted records into the RAM 213 as a FAX history database.

In step S8040, the CPU 211 identifies a record of which the start time 901 is the earliest among records each of which the output flag 908 is "not output" in the FAX history database stored in the RAM 213.

In step S8050, the CPU 211 obtains the value of the start time 901 from the record of which the start time 901 is the earliest. Then, the CPU 211 stores the obtained value into the RAM 213.

In step S8060, the CPU 211 identifies a record of which the start time 901 is the latest among the records of the FAX jobs each of which the output flag 908 is "not output" in the FAX history database stored in the RAM 213.

In step S8070, the CPU 211 obtains the value of the start time 901 from the record of which the start time 901 is the latest. Then, the CPU 211 stores the obtained value into the RAM 213.

In step S8080, the CPU 211 connects the value of the start time 901 obtained in step S8050 and the value of the start time 901 obtained in step S8070 with a hyphen. The CPU 211 further connects a character "F" thereto to generate a character string representing a filename. "F" is the initial character of "FAX" and indicates that the generated file includes an execution history of FAX jobs. Such processing will be referred to as filename generation processing.

Now, a specific example of the filename generation processing will be described. If the CPU 211 generates a filename from the transmission history database illustrated in FIG. 10, the filename is generated in the following manner. First, the CPU 211 obtains the value "201503161015" of the start time 901 of the record of which the start time 901 is the earliest among the records of the FAX jobs each of which the output flag 908 is "not output". The CPU 211 obtains the value "201503161305" of the start time 901 of the record of which the start time 901 is the latest among the records of the FAX jobs each of which the output flag 908 is "not output". The CPU 211 then connects the two values with a hyphen and attaches "F" to generate a filename "201503161015-201503161305F". The CPU 211 may attach a filename extension to the end, like "201503161015-201503161305F.csv". This makes it easy for the administrator who manages transmission histories to search for a file storing the transmission history to be viewed. Suppose, for example, that the administrator wants to view an execution history of a FAX job transmitted around 11:00, Mar. 16, 2015. In such a case, the administrator can easily find out from the filename "201503161015-201503161305F.csv" that the file can be viewed by opening the execution history of the FAX job. If the administrator wants to view an execution history of FAX jobs, the administrator can easily find out from the character "F" included in the filename that the execution history of FAX jobs can be viewed by opening which file.

In step S8090, the CPU 211 extracts the records each of which the output flag 908 is "not output" from the FAX history database stored in the RAM 213 in step S8030, and generates a csv file including the extracted records.

In step S8100, the CPU 211 sets the filename generated in step S8080 as that of the file generated in step S8090.

In step S8110, the CPU 211 attaches the file (FAX management report) generated in step S8090 to an email and transmits the email to the transmission destination specified in the transmission destination field 1413. The transmission method may be FTP-based or SMB-based file transmission. More specifically, if an email address is specified in the transmission destination field 1413, the CPU 211 transmits the file by email. If a hostname of a server is specified, the CPU 211 transmits the file to the server by FTP or SMB.

In step S8120, the CPU 211 changes the output flags 908 of the file-generated, transmission-completed records in the transmission history database stored in the HDD 214 from "not output" to "output".

In step S8130, the CPU 211 sets the value of the FAX counter to 0.

In step S8140, the CPU 211 subtracts the number of records each of which the output flag 908 is changed to "output" in step S8120 from the value of the record counter. Then, the processing illustrated in the flowchart of FIG. 15 ends. After the end of the processing, the CPU 211 repeats the processing of step S8010 again.

On the other hand, when the processing proceeds from step S8020 to step S8210, in step S8210, the CPU 211 extracts only the records of the FAX jobs each of which the value of the protocol 903 is FAX from the transmission history database illustrated in FIG. 10. Then, the CPU 211 stores the extracted records into the RAM 213 as a FAX history database.

In step S8220, the CPU 211 extracts the records of the FAX jobs each of which the output flag 908 is "not output" in the FAX history database stored in the RAM 213 in step S8210, and generates image data for printing (print data) including the extracted records.

In step S8230, the CPU 211 transmits the print data generated in step S8220 to the printer 221 and causes the printer 221 to perform printing based on the print data. Then, the processing proceeds to step S8130.

Described above is the processing by which the MFP 101 outputs the FAX management report on condition that as many records of FAX jobs of the "not output state" as the number specified in the communication number specification field 1408 are stored among the records of the transmission jobs of all the protocols stored in the transmission history database illustrated in FIG. 10.

FIG. 16 is a flowchart illustrating the processing by which the MFP 101 outputs (transmits or prints) a FAX management report if the time measured by the timer 230 has reached a predetermined time.

In step S9010, the CPU 211 determines whether the time measured by the timer 230 has reached the predetermined time. If the CPU 211 determines that the time measured by the timer 230 has reached the predetermined time (YES in step S9010), the processing proceeds to step S9020. If the CPU 211 determines that the time measured by the timer 230 has not reached the predetermined time (NO in step S9010), the CPU 211 repeats the processing of step S9010.

In step S9020, the CPU 211 determines whether transmission is specified by the transmission key 1405 on the screen illustrated in FIG. 12B. If the CPU 211 determines that transmission is specified (YES in step S9020), the processing proceeds to step S9030. On the other hand, if the print key 1404 is specified, the CPU 211 determines that transmission is not specified (NO in step S9020), and the processing proceeds to step S9210.

In step S9030, the CPU 211 extracts only the records of the FAX jobs each of which the value of the protocol 903 is FAX in the transmission history database illustrated in FIG. 10. Then, the CPU 211 stores the extracted records into the RAM 213 as a FAX history database.

In step S9040, the CPU 211 obtains and stores the current time measured by the timer 230 into the RAM 213.

In step S9050, the CPU 211 connects the time stored in the RAM 213 in step S9004 and the character "F" to generate a filename, and stores the generated filename into the RAM 213. "F" is the initial character of "FAX" and indicates that the generated file includes an execution history of FAX jobs. For example, if the time when the processing of step S9040 is performed is 15:00, Mar. 16, 2015, the CPU 211 generates a filename "201503161500F".

In step S9060, the CPU 211 extracts the records each of which the output flag 908 is "not output" from the FAX history database stored in the RAM 213 in step S9030, and generates a csv file including the extracted records.

In step S9070, the CPU 211 sets the filename generated in step S9050 as that of the file generated in step S9060.

In step S9080, the CPU 211 attaches the file (FAX management report) generated in step S9070 to an email and transmits the email to the transmission destination specified in the transmission destination field 1413. The transmission method may be FTP-based or SMB-based file transmission. More specifically, if an email address is specified in the transmission destination field 1413, the CPU 211 transmits the file by email. If a hostname of a server is specified, the CPU 211 transmits the file to the server by FTP or SMB.

In step S9090, the CPU 211 changes the output flags 908 of the transmission-completed records in the transmission history database stored in the HDD 214 from "not output" to "output".

In step S9100, the CPU 211 sets the value of the FAX counter to 0.

In step S9110, the CPU 211 subtracts the number of records each of which the output flag 908 is changed to "output" in step S9090 from the value of the record counter. Then, the processing illustrated in the flowchart of FIG. 16 ends. After the end of the processing, the CPU 211 repeats the processing of step S9010 again.

On the other hand, when the processing proceeds from step S9020 to step S9210, in step S9210, the CPU 211 extracts only the records of the FAX jobs each of which the value of the protocol 903 is FAX from the transmission history database illustrated in FIG. 10. The CPU 211 stores the extracted records into the RAM 213 as a FAX history database.

In step S9220, the CPU 211 extracts the records each of which the output flag 908 is "not output" in the FAX history database stored in the RAM 213 in step S9210, and generates image data for printing (print data) including the extracted records.

In step S9230, the CPU 211 transmits the print data generated in step S9220 to the printer 221 and causes the printer 221 to perform printing based on the print data. Then, the processing proceeds to step S9110.

Described above is the processing by which the MFP 101 outputs the FAX management report on condition that the time measured by the timer 230 has reached the predetermined time.

Through such control, the administrator can separately manage communication management reports and FAX management reports on the PC(s) serving as the transmission destination(s) of the communication management reports and the FAX management reports. Further, the administrator can easily identify the types of the jobs included in the transmitted management reports from the identifiers (characters) attached to the filenames of the files.

Other Exemplary Embodiments

In the foregoing exemplary embodiment, the information for identifying the job type is attached to only the filename of the FAX management report. However, it is not limited thereto. Information for identifying respective types of a plurality of jobs may be attached to the filename of the communication management report including the execution history of the plurality of types of jobs.

In the foregoing exemplary embodiment, year, month, day, and time are described to be all obtained from the transmission history table. However, only some of such pieces of information may be obtained to generate a filename. In the foregoing exemplary embodiment, the values of the start time 901 are described to be connected with a hyphen. However, the hyphen is an example of such a symbol, and other symbols may be used.

In the foregoing exemplary embodiment, the example is described in which the CPU 211 performs the processing of steps S4030 to S4120 if as many records of the "not output" state as the number specified in the communication number specification field 1308 are stored and the CPU 211 determines that transmission is specified in step S4020. The example is also described in which the CPU 211 performs the processing of steps S5030 to S5090 if the CPU 211 determines that the time measured by the timer 230 has reached predetermined time and transmission is specified in step S5020. However, the present invention is not limited thereto. The CPU 211 may perform the processing of steps S5030 to S5090 if as many records of the "not output" state as the number specified in the communication number specification field 1308 are stored and transmission is specified in step S4020. The CPU 211 may performs the processing of steps S4030 to S4120 if the CPU 211 determines that the time measured by the timer 230 has reached the predetermined time and transmission is specified in step S5020. The CPU 211 may perform the processing of steps S4030 to S4120 on both conditions. The CPU 211 may perform the processing of steps S5030 to S5090 on both conditions.

In the foregoing exemplary embodiment, the processing for outputting the communication management report and the FAX management report is described to be performed if the number of records or time satisfies a predetermined condition. However, it is not limited thereto. An exemplary embodiment of the present invention may be applied to the case of outputting the communication management report if an output instruction for the communication management report is accepted from the user via the operation unit 220.

The foregoing exemplary embodiment has dealt with the case of managing a transmission history and transmitting a communication management report including the transmission history. However, the present invention is not limited thereto. An exemplary embodiment of the present invention may be applied to processing for managing a job history of copy jobs and transmitting a history report including the job history of the copy jobs. A copy job refers to a job in which the scanner 222 reads an image of a document and the printer 221 prints the read image. In such a case, the filename of the file of the history report may include the initial character "C" of "COPY" to indicate that the job type is copy. An exemplary embodiment of the present invention may be applied to processing for managing a history of print jobs and transmitting a history report including the job history of the print jobs. A print job refers to a job in which the printer 221 prints an image based on print data received from the PC 103 via the LAN 100. In such a case, the filename of the file of the history report may include the initial character "P" of "PRINT" to indicate that the job type is print. Symbols corresponding to the job types may be used instead of the characters.

In the foregoing exemplary embodiment, the example is described in which the filename includes a character representing the job type to indicate an execution history of what type of job the file includes. However, the present invention is not limited thereto. Information such as a character representing the job type may be included in the file's properties (including a tag, title, comment, and creator). After the file is transmitted to the transmission destination, the execution history of what type of job the file includes can be identified by viewing properties of the file on the transmission destination PC. In the foregoing exemplary embodiment, the example is described in which the character representing the job type is included in the non-extension part of a filename with a filename extension. However, the character representing the job type may be included in the extension part.

In the foregoing exemplary embodiment, the example is described in which the MFP 101 stores the execution history of jobs executed by the own apparatus and generate a file including the execution history. However, it is not limited thereto. A history management server connected to the LAN 100 may generate a file including an execution history of jobs from history information about the jobs executed by the MFP 101 connected to the LAN 100, by using the methods illustrated in FIGS. 13 to 16. In such a case, the screens illustrated in FIGS. 12A and 12B are displayed on the history management server. The settings accepted from the screens are stored in a storage unit in the history management server. The history management server may make the determinations in steps S4010, S5010, S8010, and S9010 on the history transmission database in the HDD 214 of the MFP 101. Alternatively, the CPU 211 of the MFP 101 may make the determinations in steps S4010, S5010, S8010, and S9010, and if the determinations are YES, the CPU 211 may notify the history transmission database of the determinations and the history management server may perform the subsequent processing. In addition, the record counter and the Fax counter may be provided in the history management server. In steps S4030, S4210, S5030, S5210, S8030, S8210, S9030, and S9210, the history management server may obtain the transmission history database from the HDD 214 of the MFP 101 via the LAN 100.

In the foregoing exemplary embodiment, the example is described in which the transmission history database stores the history of transmission jobs. However, a history of reception jobs may be stored as well. An exemplary embodiment of the present invention may be implemented by performing the following processing. Specifically, the processing includes supplying a storage medium storing program code of software for implementing the functions of the foregoing exemplary embodiment to a system or an apparatus. Then, the processing further includes reading the program code stored in the storage medium by a computer (or CPU or micro-processing unit (MPU)) of the system or apparatus.

In such a case, the program code itself read from the storage medium implements the functions of the foregoing exemplary embodiment. The program code and the storage medium storing the program code constitute an exemplary embodiment of the present invention.

According to an exemplary embodiment of the present invention, the user can identify from the filename of a generated file an execution history of what type of job the file is.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-022057, filed Feb. 8, 2016, which is hereby incorporated by reference herein in its entirety.

What is claimed is:

1. A control method of controlling a data transmission apparatus including a plurality of interfaces used to transmit as a transmission job data to outside by one of a plurality of communication protocols and a storage storing execution histories of a plurality of transmission jobs including one or more facsimile transmission jobs, the method comprising:
   displaying a first screen for receiving a specifying of a first destination and settings of a first condition, wherein the first screen is related to a facsimile transmission;
   generating a first file including execution histories related to only the facsimile transmission stored in the storage according to the first condition;
   setting a first name that includes both time information and a predetermined character as a filename of the first file;
   transmitting, to the specified first destination, the first file in which the first name has been set;
   displaying a second screen for receiving a specifying of a second destination and settings of a second condition, wherein the second screen is different from the first screen;
   generating a second file including execution histories of transmission jobs in the storage according to the second condition, wherein the second file includes an execution history of a facsimile transmission job;
   setting a second name that includes time information and does not include the predetermined character as a filename of the second file; and
   transmitting, to the specified second destination, the second file in which the second name has been set,
   wherein a specifying of a filename for each of the first file and the second file is not received via the displayed first screen and the displayed second screen.

2. The control method according to claim 1, wherein a filename that includes, as the predetermined character, a character representing the facsimile transmission job is set.

3. The control method according to claim 1, wherein the data transmission apparatus includes a printer that prints an image, and wherein the execution history of the transmission job is printed by the printer.

4. The control method according to claim 1,
   wherein the data transmission apparatus further includes a scanner that scans a document, and
   wherein the transmission job is a job for transmitting image data generated by scanning the document by the scanner.

5. The control method according to claim 1, wherein each of the first condition and the second condition is either a case where, among execution histories of transmission jobs stored in the storage, number of execution histories that have not been outputted yet reaches a predetermined number or a case of reaching a predetermined time.

6. The control method according to claim 5, wherein, if the case of reaching the predetermined time is set as the first condition and the second condition, the predetermined time is used as the time information included in both of the first name and the second name.

7. The control method according to claim 1, wherein types of the transmission jobs include at least any one of electronic mail, File Transfer Protocol (FTP), and Server Message Block (SMB).

8. The control method according to claim 1, wherein the first file and the second file are transmitted as an attachment to an electronic mail.

9. The control method according to claim 1, wherein first file and the second file are is transmitted using FTP or SMB.

10. A non-transitory computer-readable storage medium storing a program for causing a computer to perform a control method, wherein the computer includes a plurality of interfaces used to transmit, as a transmission job, data to outside by one of a plurality of communication protocols and a storage storing execution histories of a plurality of transmission jobs including one or more facsimile transmission jobs, the control method comprising:

displaying first screen for receiving a specifying of a first destination and settings of a first condition, wherein the first screen is related to a facsimile transmission;

generating a first file including execution histories related to only the facsimile transmission stored in the storage according to the first condition;

setting a first name that includes both time information and a predetermined character as a filename of the first file;

transmitting, to the specified first destination, the first file in which the first name has been set;

displaying a second screen for receiving a specifying of a second destination and settings of a second condition, wherein the second screen is different from the first screen;

generating a second file including execution histories of transmission jobs in the storage according to the second condition, wherein the second file includes an execution history of a facsimile transmission job;

setting a second name that includes time information and does not include the predetermined character as a filename of the second file, and transmitting, to the specified second destination, the second file in which the second name has been set, and wherein a specifying of a filename for each of the first file and the second file is not received via the displayed first screen and the displayed second screen.

11. A data transmission apparatus, comprising, a plurality of interfaces used to transmit, as a transmission job, data to outside by one of a plurality of communication protocols;

a storage storing execution histories of a plurality of transmission jobs including one or more facsimile transmission jobs;

a display;

a memory storing instructions, and a processor executing the instructions causing the information processing apparatus to:

provide, on the display, a first screen for receiving a specifying of a first destination and settings of a first condition, wherein the first screen is related to a facsimile transmission;

generate a first file including execution histories related to only the facsimile transmission stored in the storage according to the first condition;

set a first name that includes both time information and a predetermined character as a filename of the first file;

transmit, to the specified first destination, the first file in which the first name has been set;

provide, on the display, a second screen for receiving a specifying of a second destination and settings of a second condition, wherein the second screen is different from the first screen;

generate a second file including execution histories of transmission jobs in the storage according to the second condition, wherein the second file includes an execution history of a facsimile transmission job;

set a second name that includes time information and does not include the predetermined character as a filename of the second file; and transmit, to the specified second destination, the second file in which the second name has been set, wherein a specifying of a filename for each of the first file and the second file is not received via the displayed first screen and the displayed second screen.

* * * * *